United States Patent
Brinton et al.

(10) Patent No.: US 7,362,229 B2
(45) Date of Patent: Apr. 22, 2008

(54) ENSURING THE PERFORMANCE OF MANDATED INSPECTIONS COMBINED WITH THE COLLECTION OF ANCILLARY DATA

(75) Inventors: Brett A. Brinton, Seattle, WA (US); Charles Michael McQuade, Issaquah, WA (US)

(73) Assignee: Zonar Compliance Systems, LLC, Seattle, WA (US)

( * ) Notice: Subject to any disclaimer, the term of this patent is extended or adjusted under 35 U.S.C. 154(b) by 297 days.

(21) Appl. No.: 11/247,953

(22) Filed: Oct. 11, 2005

(65) Prior Publication Data
US 2006/0081697 A1    Apr. 20, 2006

Related U.S. Application Data

(63) Continuation-in-part of application No. 10/915,957, filed on Aug. 11, 2004, which is a continuation-in-part of application No. 10/219,892, filed on Aug. 15, 2002, now Pat. No. 6,804,626, which is a continuation-in-part of application No. 09/951,104, filed on Sep. 11, 2001, now Pat. No. 6,671,646.

(51) Int. Cl.
*G08B 13/14*    (2006.01)
(52) U.S. Cl. .............................. 340/572.1; 340/825.71; 340/10.6; 73/632
(58) Field of Classification Search ............. 340/572.1, 340/825.71, 825.72, 825.69, 825.62, 10.1, 340/10.6, 933, 431; 73/121, 632, 633, 640; 702/182, 127
See application file for complete search history.

(56) References Cited

U.S. PATENT DOCUMENTS

| | | | |
|---|---|---|---|
| 4,025,791 A | 5/1977 | Lennington et al. | 250/341 |
| 4,258,421 A | 3/1981 | Juhasz et al. | 364/424 |
| 4,325,057 A | 4/1982 | Bishop | 340/539 |
| 4,763,356 A | 8/1988 | Day, Jr. et al. | 379/368 |
| 4,799,162 A | 1/1989 | Shinakawa et al. | 364/436 |

(Continued)

OTHER PUBLICATIONS

"D.O.T. Driver Vehicle Inspection Reports on your wireless phone!" *FleeTTrakkeR* $_{LLC}$ 2002-2003 *FleeTTrakkeR* $_{LLC}$ *All rights reserved* <http://www.fleettrakker.com/web/index.jsp>.

(Continued)

*Primary Examiner*—Benjamin Lee
*Assistant Examiner*—Daniel Previl
(74) *Attorney, Agent, or Firm*—Ronald M. Anderson

(57) ABSTRACT

During an inspection discrete checkpoints provide data to a portable reader, enabling a record to be generated identifying each checkpoint visited during an inspection. At least one checkpoint associated with the inspection will convey ancillary data to the portable device, either in lieu of, or in addition to, a checkpoint ID uniquely identifying a location or component inspected. The ID is not ancillary data, because the only function of the ID is to verify that an inspector was present at a particular location or component. In contrast, ancillary data are data that have an additional utility. For example, a sensor may be disposed in proximity of the component or location to be inspected. Data collected by such a sensor represents ancillary data, because such data does more than uniquely identify a particular location or component that was visited during an inspection.

18 Claims, 14 Drawing Sheets

U.S. PATENT DOCUMENTS

| | | | | |
|---|---|---|---|---|
| 4,804,937 | A | | 2/1989 | Barbiaux et al. ......... 340/52 F |
| 5,058,044 | A | | 10/1991 | Stewart et al. ......... 364/551.01 |
| 5,068,656 | A | | 11/1991 | Sutherland .................. 340/989 |
| 5,321,629 | A | * | 6/1994 | Shirata et al. .............. 702/187 |
| 5,399,844 | A | * | 3/1995 | Holland ...................... 235/376 |
| 5,459,304 | A | | 10/1995 | Eisenmann ................ 235/380 |
| 5,557,254 | A | | 9/1996 | Johnson et al. ............ 340/426 |
| 5,557,268 | A | | 9/1996 | Hughes et al. ............. 340/933 |
| 5,585,552 | A | | 12/1996 | Heuston et al. .............. 73/116 |
| 5,600,323 | A | * | 2/1997 | Boschini ..................... 341/173 |
| 5,610,596 | A | * | 3/1997 | Petitclerc .............. 340/825.23 |
| 5,671,158 | A | * | 9/1997 | Fournier et al. ............... 345/8 |
| 5,680,328 | A | | 10/1997 | Skorupski et al. ......... 364/550 |
| 5,719,771 | A | | 2/1998 | Buck et al. ................. 364/443 |
| 5,731,893 | A | * | 3/1998 | Dominique ................ 359/379 |
| 5,808,565 | A | | 9/1998 | Matta et al. ................ 340/994 |
| 5,874,891 | A | | 2/1999 | Lowe ......................... 340/433 |
| 5,942,753 | A | | 8/1999 | Dell ........................ 250/338.1 |
| 6,054,950 | A | | 4/2000 | Fontana ...................... 342/463 |
| 6,128,959 | A | | 10/2000 | McGovern et al. ........... 73/660 |
| 6,253,129 | B1 | | 6/2001 | Jenkins et al. ................ 701/29 |
| 6,396,413 | B2 | * | 5/2002 | Hines et al. ........... 340/825.49 |
| 6,505,106 | B1 | | 1/2003 | Lawrence et al. ............ 701/35 |
| 6,597,973 | B1 | | 7/2003 | Barich et al. ................. 701/29 |
| 6,609,082 | B2 | | 8/2003 | Wagner ...................... 702/182 |
| 6,671,646 | B2 | | 12/2003 | Manegold et al. .......... 702/127 |
| 2001/0053983 | A1 | | 12/2001 | Reichwein et al. ............. 705/1 |
| 2002/0147610 | A1 | | 10/2002 | Tabe .............................. 705/1 |
| 2003/0033061 | A1 | | 2/2003 | Chen et al. .................... 701/33 |
| 2003/0120745 | A1 | | 6/2003 | Katagishi et al. ........... 709/217 |

OTHER PUBLICATIONS

"Detex Announces the Latest Innovation in Guard Tour Verification Technology." *DETEX Life Safety, Security and Security Assurance.* Jan. 1, 2003. 1pp. © 2002-2004 Detex Corporation. <http://www.detex.com/NewsAction.jspa?id=3>.

"Nextel, Mortorola and Symbol Technologies Offer First Wireless Bar Code Scanner for Mobile Phones." *InvoiceDealers.*

"The Data Acquisition Unit Escorte." *The Proxi Escort.com.* Nov. 20, 2001. 4pp. Copyright © 2000 GCS General Control Systems. <http://www.gcs.at/eng/produkte/hw/escorte.htm>.

Albright, Brian: "Indiana Embarks on Ambitious RFID roll out." *Frontline Solutions.* May 20, 2002; 2pp. Available at: <http://www.frontlinetoday.com/frontline/article/articleDetail.jsp?id=19358>.

Contact: GCS (UK), Tewkesbury Gloucestershire. Dec. 11, 2002. 2pp. Copyright © 2000 GCS General Control Systems < http://www.gcs.at?eng/newsallegemein.htm>.

Kurtz, Jennifer. "Indiana's E-Government: A Story Behind It's Ranking." *INCONTEXT Indiana;s Workforce and Economy.* Jan.-Feb. 2003 vol. 4, No. 5pp. Available at <http://www.incontext.indiana.edu/2003/jan-feb03/governement.html>.

Quaan et al., "Guard Tour Systems." *Security Management ONLINE.* Sep. 16, 2003. 1pg. © 2000 <http://www.securitymanagement.com/ubb/Forum30/HTML/000066.html>.

Senger, Nancy. "Inside RF/ID: Carving A Niche Beyond Asset Tracking." *Business Solutions.* Feb. 1999: 5pp. Available at: <http://www.businesssolutionsmag.com/Articles/1999_02/990208.html>.

Spencer, Nancy. "Maximize Your Exposure." *Business Solutions.* Feb. 1999; 5pp. Available at: <http://www.businesssolutionsmag.com/Articles/1999_02/990208.htm>.

Tiscor: The Mobile Software Solutions Provider. *Inspection Manager*: An Introduction. nd. Slide Presentation; 19pp. Available: <www/TOSCOR.com>.

Want, Roy, "RFID A Key to Automating Everything." *Scientific American* (Jan. 2004): 58-65.

Tsakiri, M et al. Abstract: "Urban fleet monitoring with GPS and GLONASS." *Journal of Navigation*, vol. 51, No. 3. Published Sep. 1998. 2pp. NDN-174-0609-4097-3.

Anonymous. "Transit agency builds GIS to plan bus routes." *American City & County.* vol. 118, No. 4. Published Apr. 1, 2003. 4pp. NDN-258-0053-0664-6.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

"Tracking out of route: software helps fleets compare planned routes to actual miles. (TECHNOLOGY)." *Commercial Carrier Journal.* Published Oct. 1, 2005. 4pp. NDN-219-1054-1717-0.

* cited by examiner

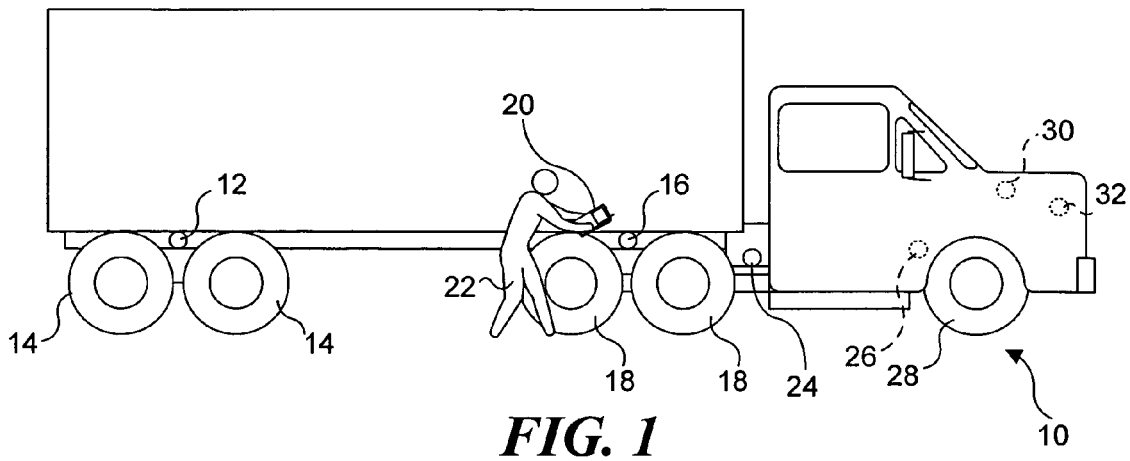
FIG. 1
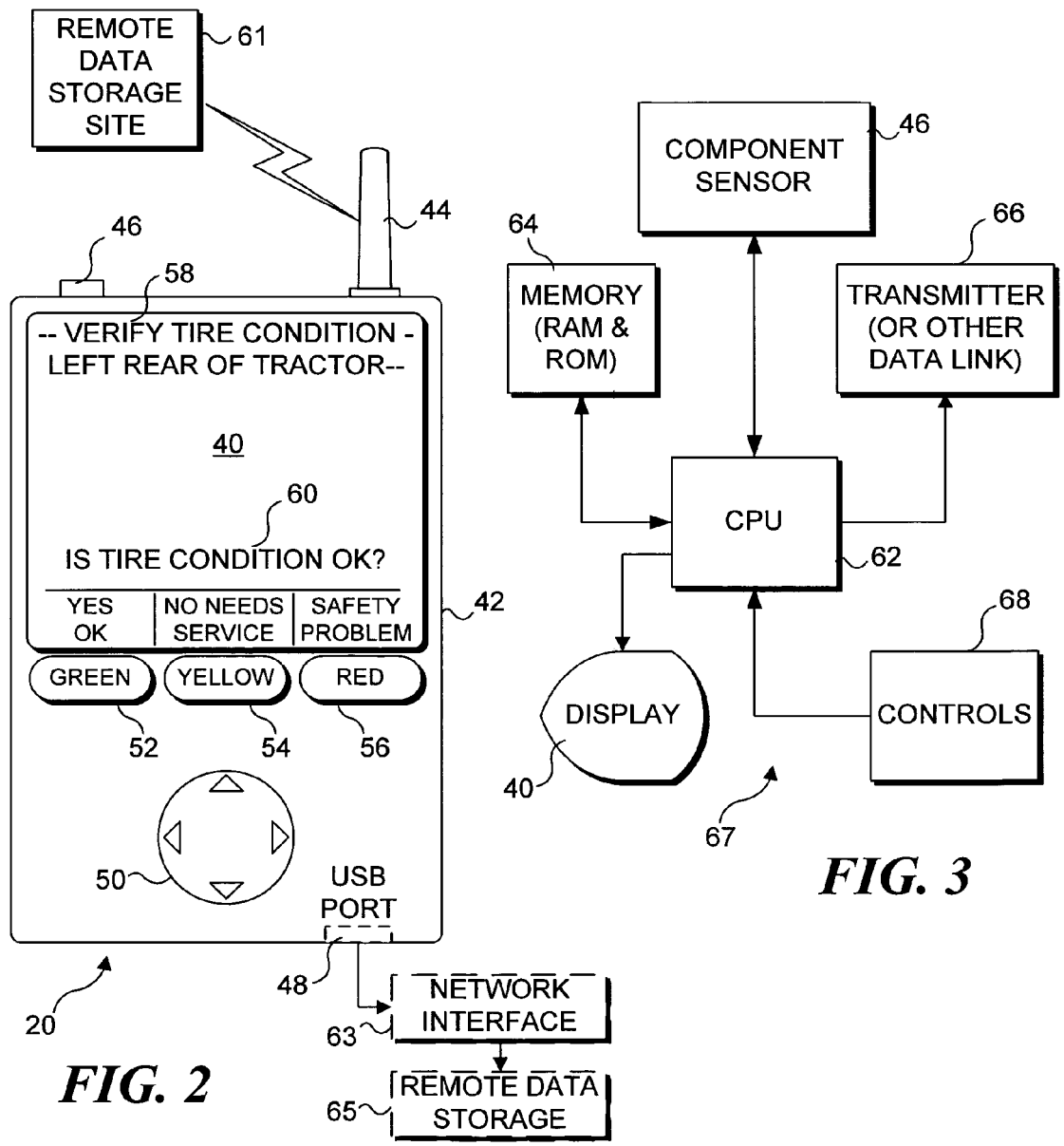
FIG. 2
FIG. 3

DRIVER'S VEHICLE INSPECTION REPORT
AS REQUIRED BY THE D.O.T. FEDERAL MOTOR CARRIER SAFETY REGULATIONS

CARRIER: _____

ADDRESS: _____

DATE: _____ TIME: _____ A.M. _____ P.M.

CHECK ANY DEFECTIVE ITEM AND GIVE DETAILS UNDER "REMARKS"

TRACTOR/
TRUCK NO. _____ ODOMETER READING _____

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _____

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _____
_____
_____
_____
_____
_____
_____

☐ CONDITION OF THE ABOVE VEHICLE IS SATISFACTORY

DRIVER'S SIGNATURE: _____
☐ ABOVE DEFECTS CORRECTED
☐ ABOVE DEFECTS NEED NOT BE CORRECTED FOR SAFE OPERATION OF VEHICLE
MECHANIC'S SIGNATURE: _____ DATE: _____

DRIVER'S SIGNATURE: _____ DATE: _____

FIG. 7 (PRIOR ART)

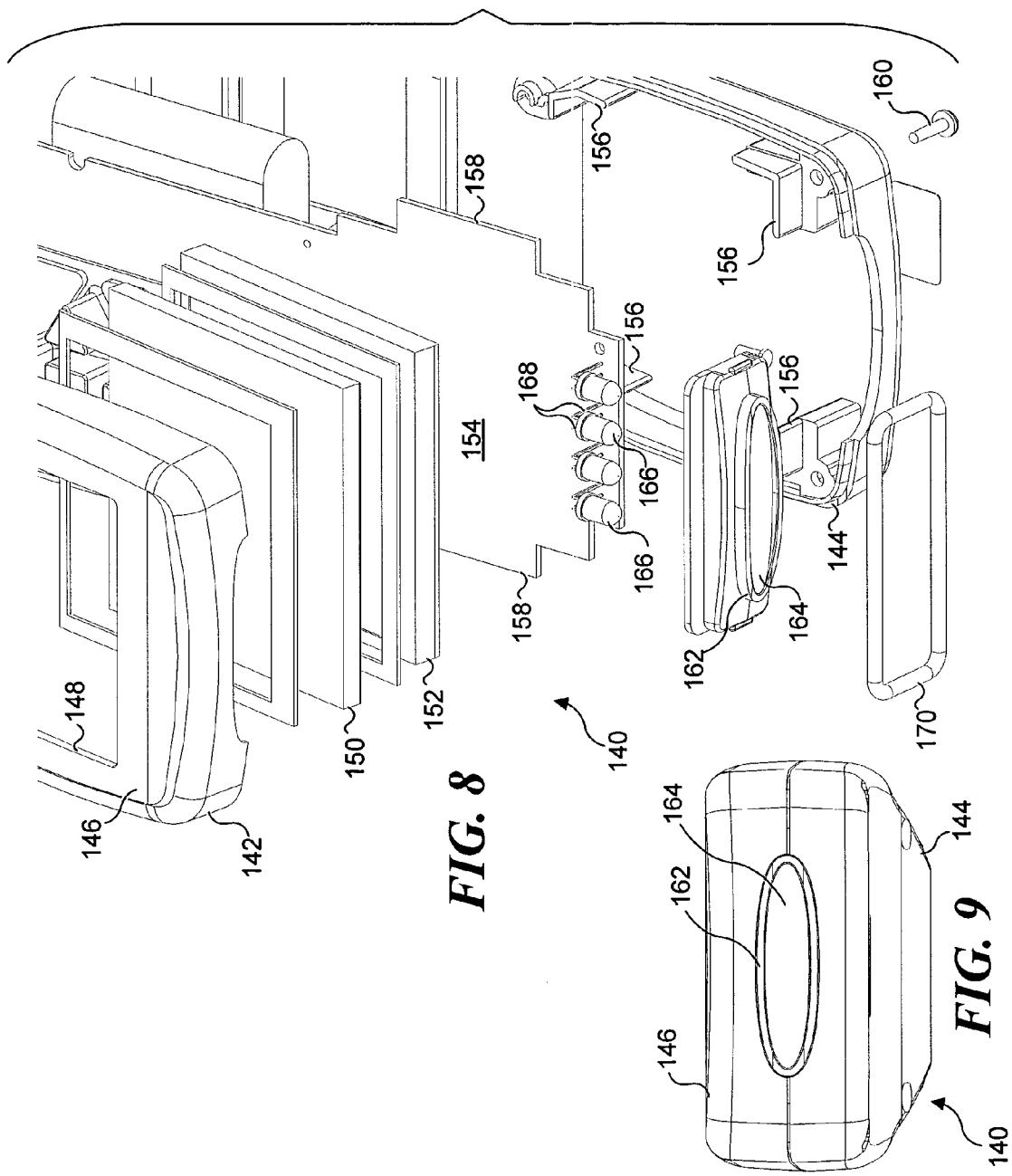

ENSURING THE PERFORMANCE OF MANDATED INSPECTIONS COMBINED WITH THE COLLECTION OF ANCILLARY DATA

RELATED APPLICATIONS

This application is a continuation-in-part of prior application Ser. No. 10/915,957, filed on Aug. 11, 2004, which itself is a continuation-in-part of prior application Ser. No. 10/219,892, filed on Aug. 15, 2002 and now issued as U.S. Pat. No. 6,804,626 on Oct. 12, 2004, which itself is a continuation-in-part of prior application Ser. No. 09/951,104, filed on Sep. 11, 2001 and now issued as U.S. Pat. No. 6,671,646 on Dec. 30, 2003, the benefit of the filing dates of which is hereby claimed under 35 U.S.C. § 120.

BACKGROUND

Mandated inspections are required in a variety of different contexts. For example, to avoid accidents caused by defective equipment, Federal law presently requires that commercial drivers make a visual inspection of specific components on a commercial vehicle such as a truck (i.e., tractor and trailer), including components such as the brake system, fuel system, warning lights, tires, etc., performing pre- and post-trip inspections of these basic, but critical components. An exemplary vehicle inspection report, listing the components and systems that must be inspected by a driver to satisfy the DOT regulations, is illustrated in FIG. 7. However, under the current system, a driver is only required to fill out a paper log and keep it on file for 90 days. Many experts report that less than half of the drivers ever perform the check; instead, many drivers simply fill out the report while seated in the cab of the truck or in a coffee shop. The report is meaningless unless the listed components and systems have actually been inspected. For example, a driver who fails to actually inspect components on his vehicle will not notice that brake fluid is leaking from a hydraulic master brake cylinder. As a result, the brakes on the driver's truck may fail, potentially causing a serious accident.

Unfortunately, a signed inspection report does not provide any assurance that a driver actually inspected the components included on the report, because the individual tasked with performing the inspection could simply sit in a comfortable location, such as the cab of the vehicle, and complete the inspection report without actually physically being present at the locations requiring inspection. Thus, it would be desirable to provide a way to verify that the person tasked with performing an inspection actually was present at the location requiring inspection.

SUMMARY

One concept described in detail below relates to automatic collection of ancillary data during an inspection. The term "ancillary data" is intended to refer to data that does more than simply verify that an inspector was present at a particular location, checkpoint, or component during an inspection, and might, for example, include data corresponding to values of parameters collected during the inspection.

A related concept, also described herein, is directed to a method for generating a record indicating that a component of a vehicle, or other type of apparatus or system, or a specific location, was visited during an inspection. Such a method employs a portable device for use in recording data related to the inspection. The portable device includes a sensor that produces a signal indicative that an operator has positioned the portable device proximate a component/location. A record of the signal produced by the sensor is made and is stored within the portable device, providing evidence that the operator was sufficiently close to the component to make an inspection of the component. Preferably, each different component or location visited during an inspection will provide a different signal to the portable device, such that the record generated by the portable device can be used to identify the locations/components that were inspected, and the locations/components that may have been inadvertently omitted from the inspection. One technique for implementing this method involves providing a token at each location/component, where the token conveys a unique token identification (ID) to the portable device when the portable device is proximate the token.

With respect to the method of collecting ancillary data during an inspection described in detail herein, at least one such token will convey ancillary data to the portable device, either in lieu of, or in addition to, a token ID uniquely identifying a location or component. Note that the token ID itself is not ancillary data, because the only function of the token ID is to verify that an inspector was present at a particular location or component associated with the token ID. In contrast, ancillary data are intended to represent data that have an additional utility. For example, a sensor may be disposed in proximity to the component or location to be inspected. Data collected by such a sensor represents ancillary data, because such data does more than uniquely identify a particular location or component that was visited during an inspection. In accord with one exemplary embodiment, during an inspection, ancillary data will be collected from at least one location or component during the inspection.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a schematic diagram of a tractor and trailer equipped with tokens at each component to be inspected, illustrating a person using a portable device in accord with the present invention;

FIG. 2 is a top plan view of a portable device for use in making a safety inspection of a tractor and trailer, showing a message that prompts the operator to inspect the left rear tires of the tractor;

FIG. 3 is a schematic block diagram of the functional components included in the portable device of FIG. 2;

FIG. 7 (Prior Art) is an exemplary manually-completed inspection record used for safety inspections of tractors and trailers, illustrating the specific components and systems that are required to be inspected;

FIG. 8 is an exploded isometric view of a portion of a second embodiment of the portable device that includes a plurality of lights;

FIG. 9 is an isometric view of a front portion and lower surface of the second embodiment of FIG. 8;

Figure 18:
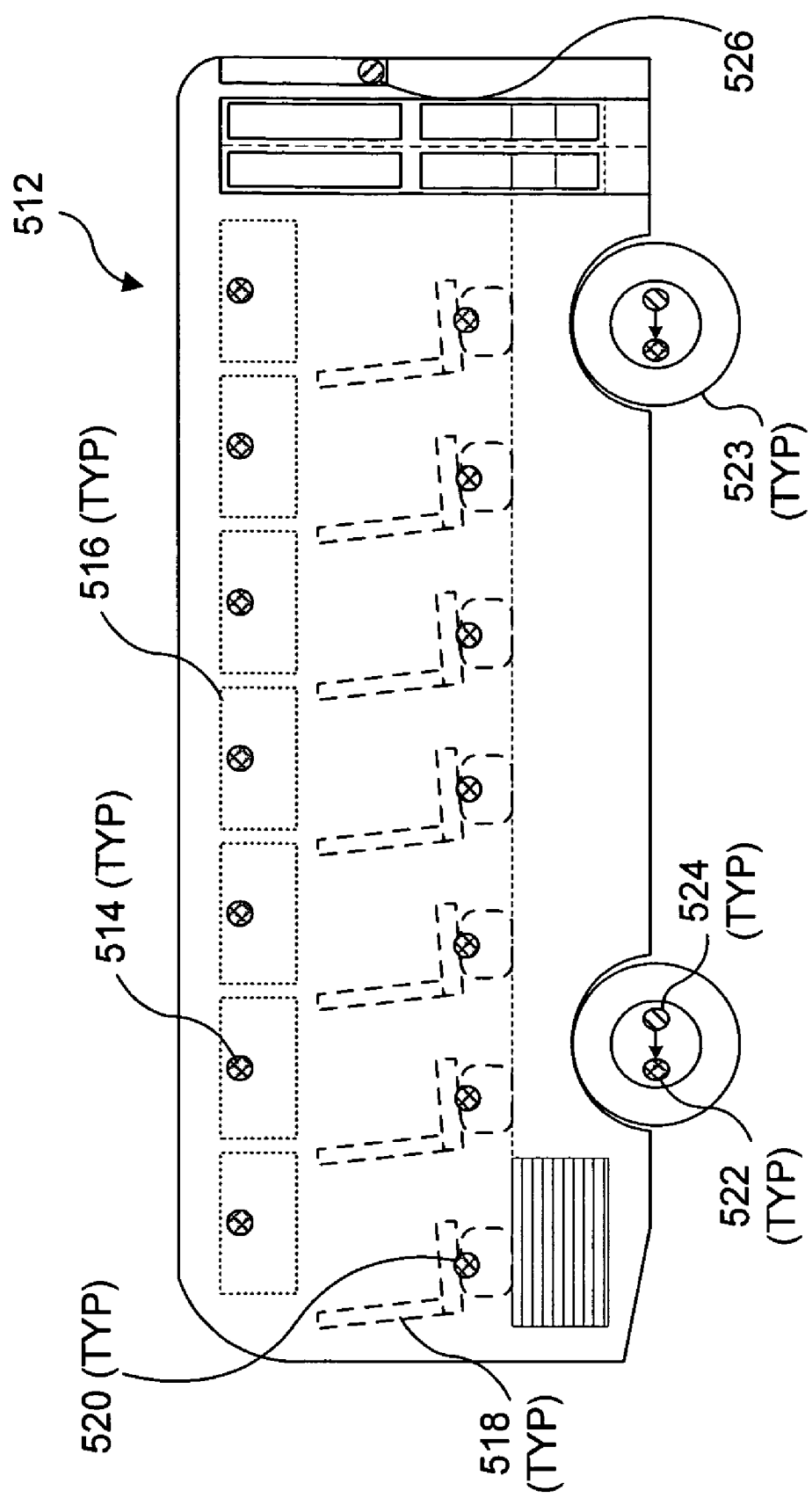
Figure 19:
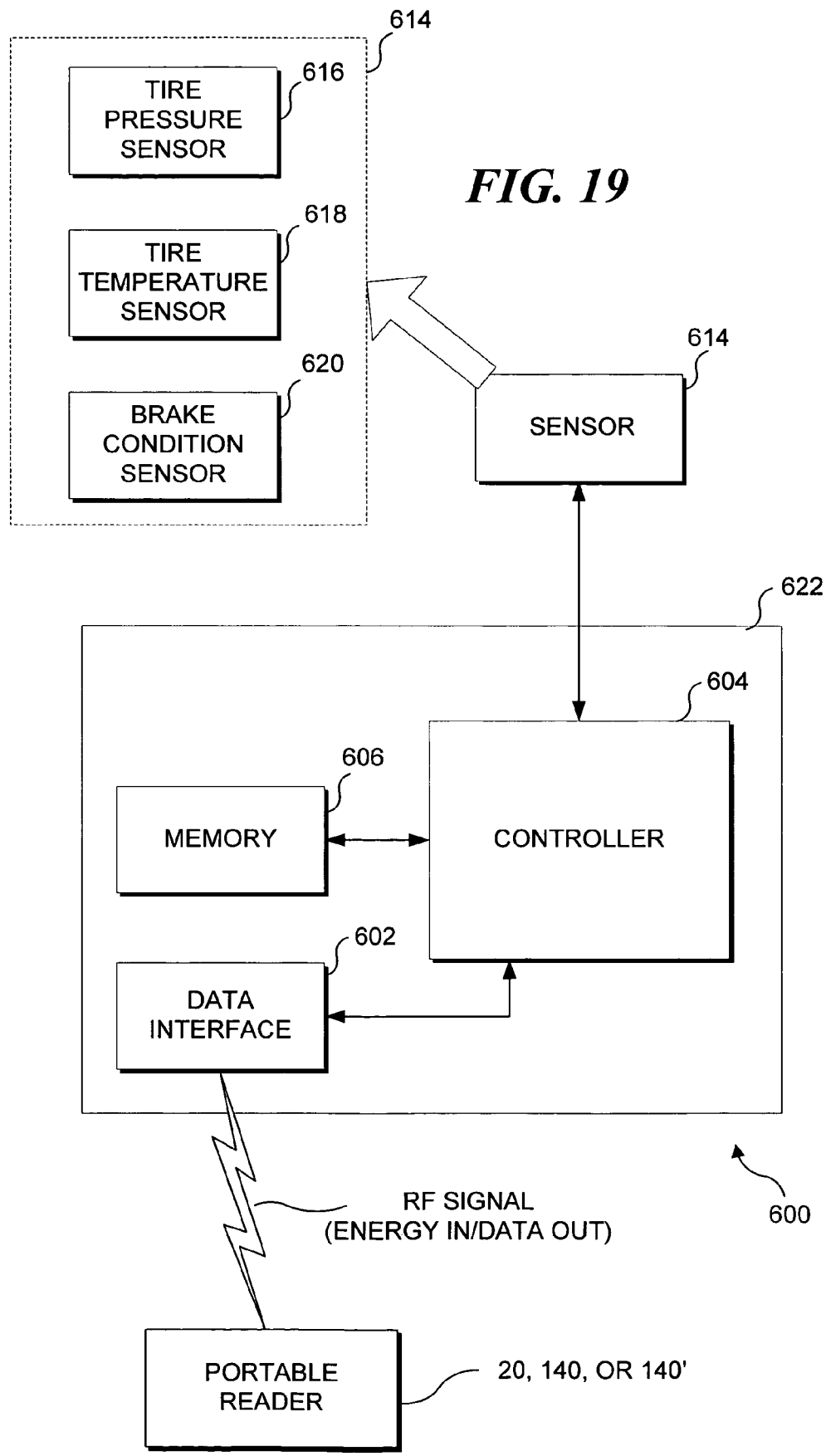
Figure 20:
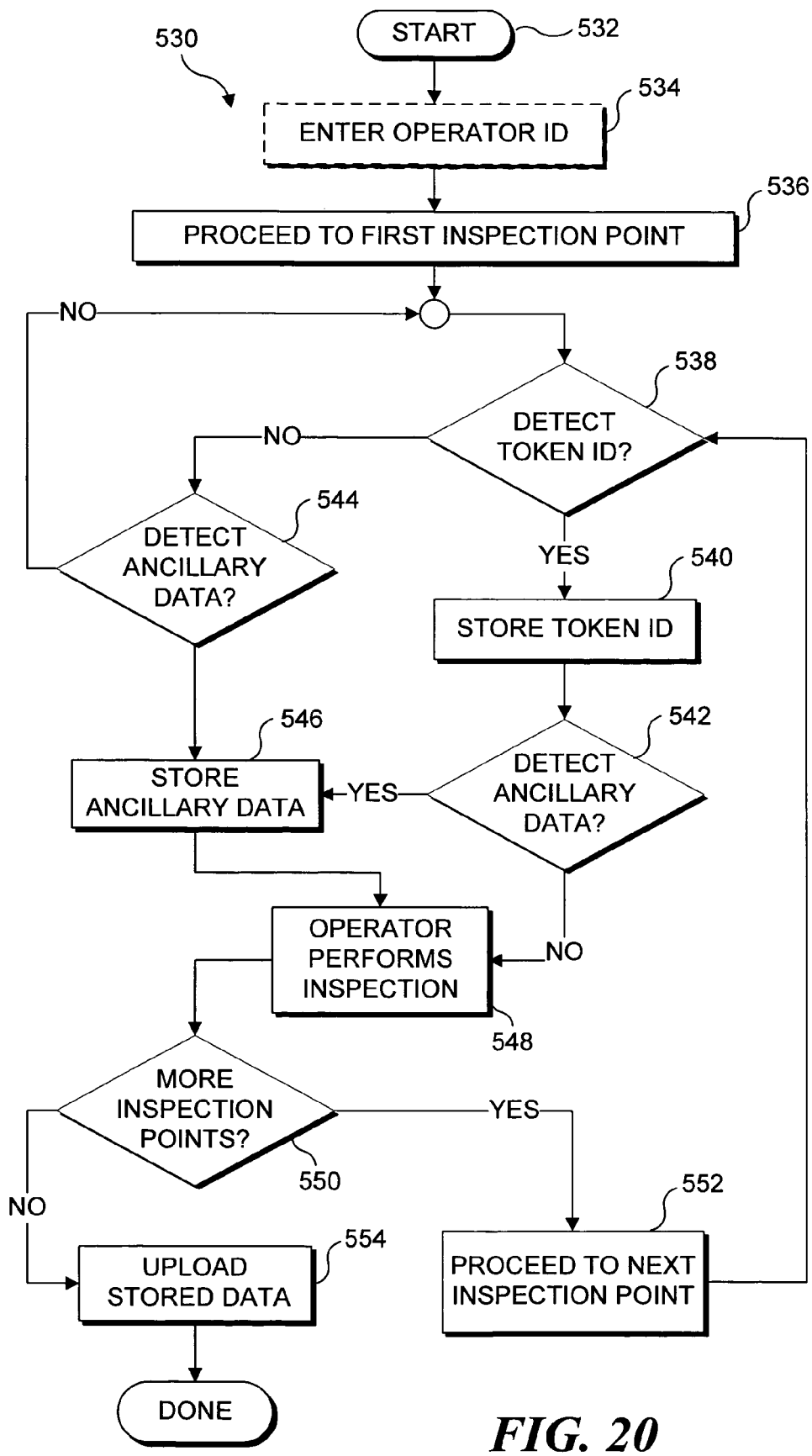

FIG. 18 schematically illustrates a public transport vehicle configured to enable the portable devices described herein to automatically collect inspection data and ancillary data, contemporaneously with an inspection;

FIG. 19 schematically illustrates an exemplary token configured to convey ancillary data to a portable device; and FIG. 20 is a flow chart illustrating the steps employed in contemporaneously collecting inspection data and ancillary data.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

Utility of the Various Exemplary Embodiments Described Herein

The present concept disclosed herein is applicable to recording data resulting from an inspection of almost any type of vehicle, equipment, apparatus, or system, and is particularly applicable to inspections in which it is desirable to maintain a data record as evidence that the person making the inspection was actually physically present at a checkpoint, location, or component requiring inspection. While the data accumulated using the present concept is not conclusively presumptive evidence that each location or component to be inspected was indeed carefully inspected, in most cases, if a person is required to visit a location or component, it is very likely that the person will actually inspect the location or component. By encouraging a person making an inspection to be physically close enough to a particular location or component to carry out an inspection, and by providing evidence of that fact in the data recorded, there is at least a justifiable presumption that the person actually performed the inspection.

It should be recognized that while a portion of the following disclosure is specifically directed to the pre-trip inspection of commercial vehicles, that such an inspection is intended to be exemplary, rather than limiting the inventive concept disclosed herein. In particular, the contemporaneous collection of ancillary data during an inspection will be discussed in detail below, and such ancillary data can be collected during any type of inspection, regardless of whether the inspection is related to a vehicle, or related to a safety inspection.

A majority of the present disclosure refers to the inspection of a component. In many cases, particularly with respect to the pre-trip inspection described in detail below, specific components (such as a vehicle lights, vehicle brake systems, vehicle tires, etc.) are being inspected. In other inspections, rather than a specific component being inspected, the purpose of the inspection is to check a general location. For example, the terrorist threat to public transportation may prompt a requirement that all passenger vehicles (such as trains, buses, and airplanes) be regularly inspected. Rather than indicating that specific components of the vehicle need to be inspected, an inspection directed to minimizing a terrorist threat will likely involve checking those portions of the vehicle that can be accessed by passengers, to ensure that no passenger has left behind a potentially dangerous device, such as an explosive or toxin. This may involve thoroughly inspecting locations such as restrooms, galleys, seating areas, overhead storage bins, and other areas that can be accessed by passengers during transit. In this case, the inventive concept described herein can be used to verify that an inspector was present at a series of predefined locations associated with a particular vehicle. Thus, it should be understood that an inspection can involve a specific component (such as a vehicle tire), a predefined checkpoint (such as each door in a transit or other facility), or a particular location (such as the seating area and luggage bins in a transportation vehicle).

FIG. 1 illustrates a tractor-trailer 10 with which an embodiment of the present invention is usable to carry out a safety inspection. Tractor-trailer 10 is provided with a plurality of tokens affixed adjacent to each checkpoint or component that is to be inspected. While only a few of the tokens are illustrated in FIG. 1, FIG. 7 (Prior Art) lists all of the components or systems that should be inspected if a driver is to be in compliance with the DOT regulations regarding pre- and post-inspections of such vehicles. A token will preferably be affixed adjacent to the components and systems listed in FIG. 7, although several components might be associated with the same token. For example, in the engine compartment, one token might be used for both the radiator and the belts. As a driver moves about the tractor and trailer, evidence that the driver or the person doing the inspection moved sufficiently close to the components being inspected so that the inspection could actually take place is recorded in a portable device 20 (first embodiment). Further details of portable device 20 and of other related embodiments are described below.

For the few tokens illustrated in FIG. 1, the relevance of the disposition of the token adjacent to a corresponding component of the tractor-trailer 10 should be evident. For example, token 12 is disposed adjacent to tandem dual rear tires 14 on the trailer. Since all the tires of the tandem dual rear wheels on the left rear of the trailer are readily visible from a position adjacent to token 12, a single token is sufficient to determine that the driver was sufficiently close so that all four tires at the left rear of the trailer could be readily inspected. Similarly, tandem dual wheels 18 on the left rear of the tractor are readily inspected when an observer 22 is positioned as shown in FIG. 1. In this position, the observer moves portable device 20 within a maximum predefined range of token 16, which is exposed above tandem dual wheels 18. Portable device 20, detects and responds to token 16, recording data indicating that the driver was in a position to inspect tandem dual rear wheels 18 on the tractor. It is contemplated that the operator may initiate the recognition of a token by activating a switch, or the portable device can instead simply respond when a token is sufficiently close to the portable device.

Other tokens 24, 26, 30, and 32 are illustrated adjacent other components of the tractor that are part of the safety inspection. For example, token 26 is affixed adjacent a tire 28 on the right front of the tractor, while tokens 30 and 32 are accessible if the front hood of the tractor is opened and are disposed adjacent the hydraulic brake master cylinder and the engine belts/radiator, respectively (not shown separately).

For each token there is a predetermined maximum distance that portable device 20 can be held from the token that will enable the portable device to detect the token, and thus, the component that is associated with it in order to produce a record as evidence that the person holding the portable device was in a position to inspect the component. Depending upon the component to be inspected and the type of token, different predetermined maximum distances may be assigned to the various components. The different predetermined maximum distances might be implemented by partially shielding a token to vary the distance at which the portable device can detect the token.

Operator 22 is prompted to approach the next component in a series of components that must be checked during the safety inspection by a message 58 appearing on a display 40 of portable device 20, as shown in FIG. 2. For example, if operator 22 has just completed the inspection of tandem dual tires 14 on the left rear of the truck, display 40 provides a prompt 58 indicating that the operator should "verify tire condition—left rear of tractor." A sensor 46 on portable device 20 responds to token 16 when the portable device is held less than the predetermined maximum distance from token 16 by producing a signal indicating that the portable device was within the required range of tandem dual tires 18 to enable the operator to inspect the tires. Display 40 also provides a prompt 60 to operator 22 requesting that the operator indicate whether the tire condition is okay. If so, the operator presses a green control button 52 corresponding to the message "YES, OK." However, in this first embodiment of the portable device, if during the visual inspection of the tires the operator determines that they require servicing, the operator is prompted to depress a yellow control button 54 on the portable device. (The other embodiments of the portable device that are described below do not include a yellow control button, but instead invite the operator to indicate the condition of the component.)

Certain conditions such as a tread separation or a nail or other sharp object lodged in the tire would likely lead the person doing the inspection to depress a red control button 56, indicating a safety problem that requires the operator to refer to a supervisor who will likely elect to delay the trip until the tire is repaired and/or replaced or take other appropriate action depending upon the nature of the component and the type of problem that makes the component unsafe to use. Portable device 20 also includes a cursor control 50, which is a four-position switch that enables a cursor (not shown in this Figure) to be moved up or down, and left or right. Cursor control 50, green, yellow, and red control buttons 52, 54, and 56 (respectively), and display 40 are all disposed on a front surface of a housing 42 of portable device 20. Sensor 46 is disposed on the top edge of housing 42, while an optional universal serial bus (USB) port 48 is disposed on the bottom edge of housing 42, opposite from sensor 46.

In this embodiment, an antenna 44 is also disposed on the top edge of the housing for transmitting radio frequency (RF) transmissions to a remote data storage site 61 that is used for long-term storage of data resulting from safety inspections. The data produced by a safety inspection indicates each of the components of the vehicle (or other system or apparatus being inspected) that were visited by the operator, so that the portable device was positioned within the predetermined maximum distance from the token associated with the component, and further indicates the status of the component. In the event that the component appears to need service or represents a safety problem (as would be evident if the operator depressed yellow control button 54 or red control button 56, respectively), the operator is prompted to select one of a plurality of predefined conditions that justify the state of the component determined by the operator and best represent its observed condition.

If the state of the component is okay and green control button 52 is depressed (i.e., if the component does not require any service and is usable or otherwise within its nominal operating parameters), there is no need to provide an indication of the condition of the component. The condition need only be recorded as part of the data stored in the portable device if either yellow control button 54 or red control button 56 is depressed by the operator to indicate the state of the component being other than "OK."

Figure 4:
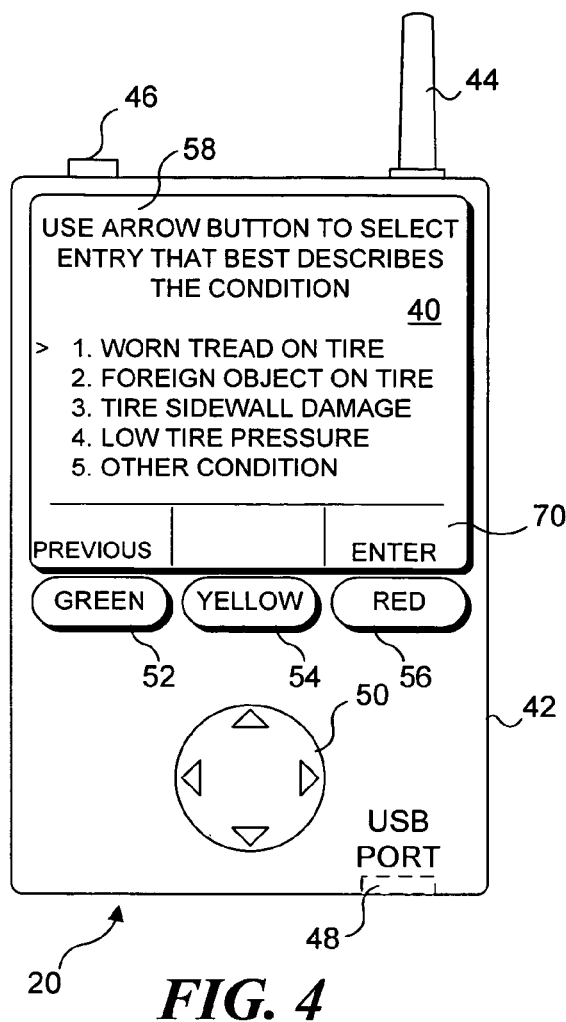
FIG. 4 is a top plan view of the portable device of FIG. 2, illustrating a menu that indicates possible conditions of tires in need of service.

A further example, illustrating the selection of a condition relating to the example shown in FIG. 2, is included in FIG. 4. As shown in FIG. 4, if the operator has indicated that the state of the tires is such that they need service by pressing yellow control button 54, portable device 20 automatically displays several possible conditions that would have led an operator to indicate that state. In the example shown, message 58 prompts the operator to use the arrow button (i.e., cursor control 50) to select a possible condition from among the listed options that best describes the observed condition of the tires. Display 40 includes five possible conditions, the last of which covers any condition that might not be included among the first four that are listed. Using cursor control 50, the operator can move the cursor to the displayed statement that best describes the observed condition of the tire and then can depress red control 56, which corresponds to an "Enter" menu option 70 on display 40 for this screen. Green control 52 can be depressed to select a "Previous" display, if the operator elects to reconsider the state of the component that was previously selected.

FIG. 3 illustrates functional components 67 that are included in portable device 20, either on or inside housing 42. A central processing unit (CPU) 62 comprises the controller for portable device 20 and is coupled bi-directionally to a memory 64 that includes both random access memory (RAM) and read only memory (ROM). Memory 64 is used for storing data in RAM and machine instructions in ROM that control the functionality of CPU 62 when executed by it. CPU 62 is also coupled to receive operator input from controls 68. Collectively, controls 68 include green control button 52, yellow control button 54, red control button 56, and cursor control 50. In addition, CPU 62 provides text and graphics to display 40 for the prompts and other messages, and menu items and options from which the operator can select using cursor control 50.

After operator 22 has visited each of the checkpoints required for the safety inspection, the operator can optionally transmit the data that have been collected during the inspection to remote data storage site 61 through an RF transmission via antenna 44. The data provides evidence that the operator has visited the components and indicated the state and condition of the components that were visited and inspected. Alternatively, optional USB port 48, on portable device 20, can be coupled to a network interface 63 on an external cradle or docking station (an example of which is described below in connection with other embodiments of the portable device), which is in communication with remote data storage 65, as shown in FIG. 2. In FIG. 3, CPU 62 is shown communicating data to transmitter 66 (or through another data link) using a wire and/or wireless data communication link. The data collected and stored (in memory 64 of portable device 20) during the safety inspection can thus be safely transferred to the remote data storage site and retained for as long as the data might be needed.

In some cases, it may be preferable to transmit the data to the remote site immediately after making a safety inspection to ensure that the data retained in memory 64 are not lost should an accident occur that destroys portable device 20. An accident destroying the evidence that the safety inspection was implemented could have an adverse effect during any litigation related to the accident, which might allegedly have been caused by one of the components inspected. However, since the risk of such an accident is relatively remote, it is contemplated that an operator may collect the data from a number of safety inspections in memory 64 and then subsequently upload the data to remote data storage 65 by coupling the data to the external cradle or docking station that includes a USB port terminal and network interface to couple over the Internet or other network to a remote storage. The cradle or docking station might be maintained by a carrier at a freight terminal at least periodically visited by the truck that was inspected.

Alternatively, the external cradle or docking station might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 20 through USB port 48 to such a data communication system, the data stored within memory 64 can readily be transmitted to a remote site maintained by the carrier for long-term storage, even while a trip is in progress.

The tokens that are affixed at various points on the tractor-trailer (or adjacent components of other types of systems or apparatus unrelated to a vehicle) can be of several different types, depending upon the type of sensor 46 that is included on portable device 20. In a preferred form of the present invention, the token that is preferably employed is a radio frequency identification (RFID) tag that is attached with a fastener or an appropriate adhesive to a point on a frame or other support (not shown) adjacent to the component associated with the token. One type of RFID tag that is suitable for this purpose is the WORLDTAG™ token that is sold by Sokymat Corporation. This tag is excited by an RF transmission from portable device 20 via antenna 44. In response to the excitation energy received, the RFID tag modifies the RF energy that is received from antenna 44 in a manner that specifically identifies the component associated with the RFID tag, and the modified signal is detected by sensor 46.

An alternative type of token that can also be used in this invention is an IBUTTON™ computer chip, which is armored in a stainless steel housing and is readily affixed to a frame or other portion of the vehicle (or other type of apparatus or system), adjacent to the component associated with the IBUTTON chip. The IBUTTON chip is programmed with JAVA™ instructions to provide a recognition signal when interrogated by a signal received from a nearby transmitter, such as from antenna 44 on portable device 20. The signal produced by the IBUTTON chip is received by sensor 46, which determines the type of component associated with a token. This type of token is less desirable since it is more expensive, although the program instructions that it executes can provide greater functionality.

Yet another type of token that might be used is an optical bar code in which a sequence of lines of varying width encodes light reflected from the bar code tag. The encoded reflected light is received by sensor 46, which is then read by an optical detector. Bar code technology is well understood in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines can be properly read. If the bar code is applied to a plasticized adhesive strip, it can readily be mounted to any surface and then easily cleaned with a rag or other appropriate material.

Yet another type of token usable in the present invention is a magnetic strip in which a varying magnetic flux encodes data identifying the particular component associated with the token. Such magnetic strips are often used in access cards that are read by readers mounted adjacent to doors or in an elevator that provides access to a building. However, in the present invention, the magnetic flux reader comprises sensor 46 on portable device 20. The data encoded on such a token are readily read as the portable device is brought into proximity of the varying magnetic flux encoded strip comprising the token.

As yet another alternative, an active token can be employed that conforms to the BLUETOOTH™ specification for short distance data transfer between computing devices using an RF signal. However, it is likely that the range of the signal transmitted by the token would need to be modified so that it is substantially less than that normally provided by a device conforming to the BLUETOOTH specification. It is important that the portable device be able to detect that it is proximate to the component only within a predetermined maximum range selected to ensure that the operator is positioned to actually carry out an inspection of the component.

Logical Steps Implemented in the Present Invention

Figure 5:
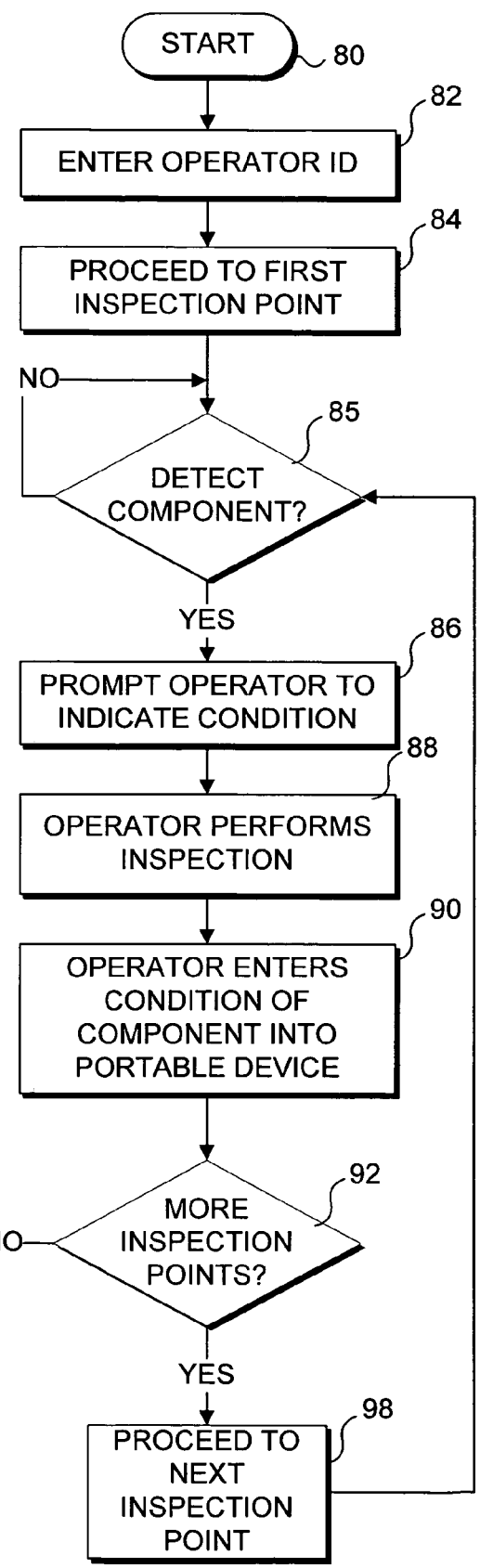
FIG. 5 is a flow chart showing the steps followed in carrying out a safety inspection in accord with the present invention.

FIG. 5 illustrates the logical steps implemented in connection with the present invention to carry out a safety inspection of a vehicle or other apparatus or system. From a start block 80, a step 82 provides for manual entry of an operator identification (ID) into a data record, or the operator ID can already be stored in memory of the portable device, or can be automatically entered in response to a special operator ID tag disposed on the vehicle. Cursor control 50 is employed to sequentially select digits from a displayed list, to input the operator ID for the individual making the safety inspection. The operator ID might be a four (or more) digit number or alphanumeric code. Alternatively, a plurality of possible operator IDs might be displayed as a list on portable device 20, enabling the operator to select his/her operator ID from the list using cursor control 50 and one of the three control buttons.

Once the operator ID is entered, portable device 20 prompts the operator to proceed to a first inspection point at a step 84. For example, as indicated in FIG. 2, message 58 prompts the operator to verify the tire condition on the left rear of the tractor. A decision step 85 determines if the portable device has detected the token associated with the component that is next to be inspected. If not, the logic loops until the component is detected. Once sensor 46 on portable device 20 has detected the token associated with the current component to be inspected, the logic then advances to a step 86 in which the operator is prompted to indicate a state of the component (and possibly, its condition). In a step 88, the operator performs the inspection, which may involve visually observing the state and condition of the component, or carrying out other steps that might be required to confirm the state and condition of the component. It is contemplated that in some types of inspections, a series of one or more steps might be required to test the component to determine if it is operating properly, needs maintenance or repair, or is unusable. Again, portable device 20 can be programmed to provide appropriate prompts to direct the operator through the series of steps required to carry out the inspection of such a component. Accordingly, in a step 90 the operator selectively enters the condition of the component into portable device 20 using the control buttons and cursor control 50.

A decision step 92 determines if there are further inspection points in the safety inspection currently being carried out. If not, a step 94 provides for transmitting or loading the inspection data into storage at a remote site; this step can be done immediately after the inspection is completed, or at some later time, perhaps after additional safety inspections have been completed, and/or after the portable device has been inserted into the external cradle or docking station. Once the data are transmitted to the remote site for long-term storage, the process is completed in a step 96.

Assuming that further inspection points remain in the safety inspection at decision step 92, a step 98 provides for the operator to proceed to the next inspection point, which will again be determined by a prompt displayed to the operator on display 40 of portable device 20. The logic then loops back to decision step 85, which determines if the sensor on the portable device has detected the component, indicating that the portable device is within the predefined maximum range of the token, thus ensuring that the operator is sufficiently close to the component to inspect it.

Figure 6:
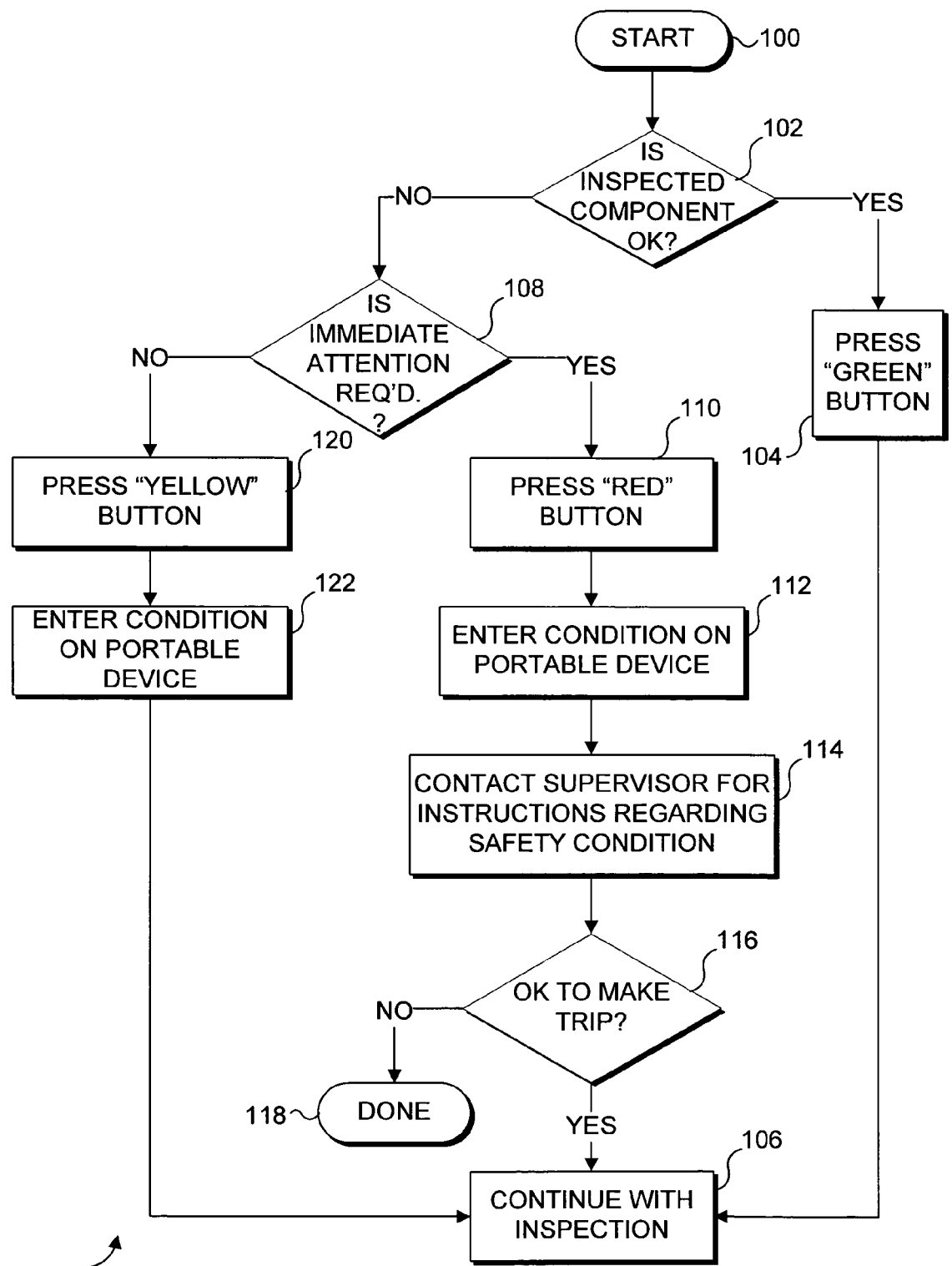
FIG. 6 is a flow chart illustrating the steps employed in recording a condition of a component that is being inspected using the portable device of FIGS. 2 and 4.

Further details of step 90 are illustrated in FIG. 6. From a start block 100, a decision step 102 determines if the inspected component is okay. If so, the operator presses green control button 52 in a step 104. Since the component is okay, nothing further is required for that component, and the logic then proceeds to a step 106, which provides that the operator can continue with the inspection, i.e., proceed with decision step 92 in FIG. 5.

However, if the determination in decision step 102 indicates that the inspected component is not okay, a decision step 108 enables the operator to determine if immediate attention is required. If so, the operator presses red control button 56 at a step 110 and enters the condition of the component on the handheld unit. For example, if the operator is inspecting a tire and determines that the tread of the tire is separating, i.e., that the tire should not be used but should instead be replaced, the operator would use the cursor control on the portable device to select an option for the condition "tread separating from tire" at a step 112. In many types of inspections, the operator will be required to contact a supervisor for instructions regarding the safety condition, at a step 114. In the example just noted, the supervisor would likely arrange for the tire to be replaced by maintenance or repair personnel before the operator makes a trip in the vehicle.

In some cases, a supervisor might override the operator's determination of the state of the component based upon the reported condition. Therefore, a decision step 116 determines if the supervisor has given authorization to the operator to make the trip, scheduling a later repair of the component. If so, the logic proceeds to step 106, in which the operator continues with the inspection as described above. If not, there is no further need to inspect the remainder of the vehicle at that point, since the complete inspection will need to be carried out again after the unsafe condition has been corrected, e.g., by replacing the defective tire. The logic is then done, as indicated in step 118.

In the event that the operator determines that immediate attention is not required at decision step 108, at a step 120, the operator presses yellow control button 54 on portable device 20. The operator then selects and enters the condition noted on the portable device, as indicated in a step 122. In the example shown in FIG. 4, five possible conditions are indicated by statements on display screen 40 for a tire that is still usable but needs service. In this case, the operator employs cursor control 50 to move the cursor to a selected statement that thus describes the observed condition of the component and then depresses red control button 56 to enter the condition, creating a record of the state and condition of the component currently being inspected that is retained within the memory of the portable device. Thereafter, the logic proceeds to step 106, in which the operator continues with the inspection.

Alternative Embodiments of Portable Device

Two additional embodiments of the portable device are illustrated in FIGS. 8 and 9, and 10 and 11, respectively. A portable device 140, which is shown in FIGS. 8 and 9, has a top housing 142, which is joined to a bottom housing 144 and includes a display bezel opening 148. Only a portion of a top surface 146 of the top housing is illustrated in these Figures, although further details of the top surface are generally similar to the embodiment shown in FIG. 11, which is discussed below.

As clearly illustrated in the exploded view of FIG. 8, a substantially transparent protective plastic window 150 is mounted behind display bezel opening 148 to protect the upper surface of a liquid crystal display (LCD) 152. LCD 152 underlies the protective plastic window and is mounted on a printed circuit (PC) board 154, along with a number of other components (including CPU 62, memory 64, component sensor 46, and control 68, as shown and described above in connection with FIG. 3). A plurality of corner supports 156 engage side tabs 158 on PC board 154. In addition, a plurality of threaded fasteners 160 (only one of which is shown) extend between top housing 142 and bottom housing 144, to secure the two housings together, locking PC board in a position defined by corner supports 156 in cooperation with side tabs 158.

A front bezel 162 is seated at a front end of top housing 142 and bottom housing 144 and includes a lens 164 that is substantially transparent and serves to focus light emitted by a plurality of light emitting diodes (LEDs) 166, which emit white light. LEDs 166 are electrically coupled to PC board 154 by leads 168, which are soldered to appropriate electrically conductive trace connections (not shown) on the PC board 154. An elastomeric seal 170 is fitted around front bezel 162 to seal out dirt, moisture, and other contaminants from the interior of portable device 140. Since LEDs 166 are disposed immediately behind lens 164, the white light emitted by the LEDs is generally focused by lens 164 so that it can be directed by the operator of the portable device onto a component that is being inspected. Such components are sometimes disposed in areas that are not well illuminated by ambient light. Thus, the light from LEDs 166 better enables an operator to use portable device 140 to more clearly see a component that is being inspected and to better observe the condition of the component in order to determine its safety status. Including LEDs 166 on the portable device avoids the need to use a separate flashlight or other source of light to inspect components that are not well lighted by ambient light, or which must be inspected at night.

Figure 10:
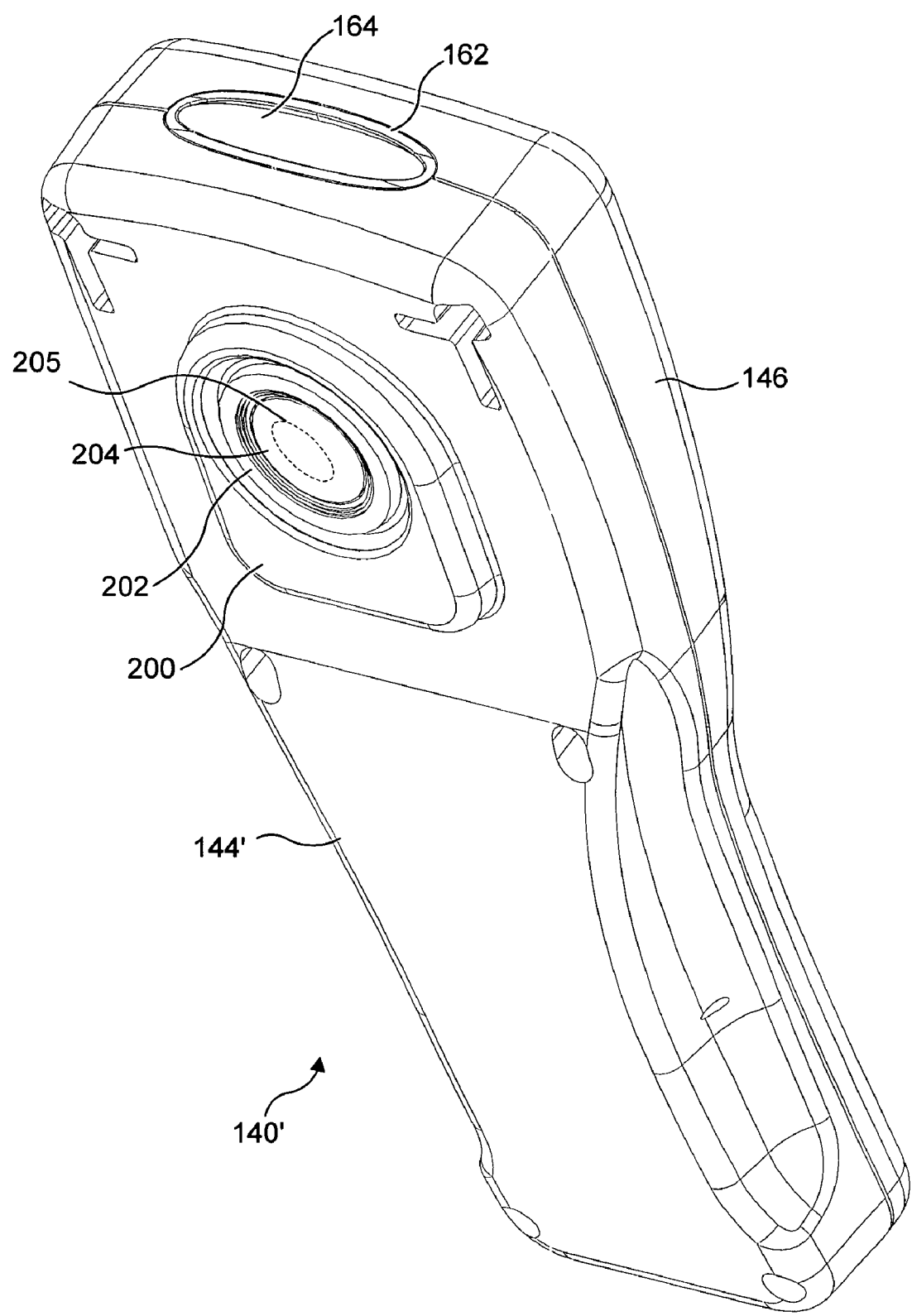
FIG. 10 is an isometric view of the lower surface of a third embodiment of the portable device that includes a digital camera.
Figure 11:
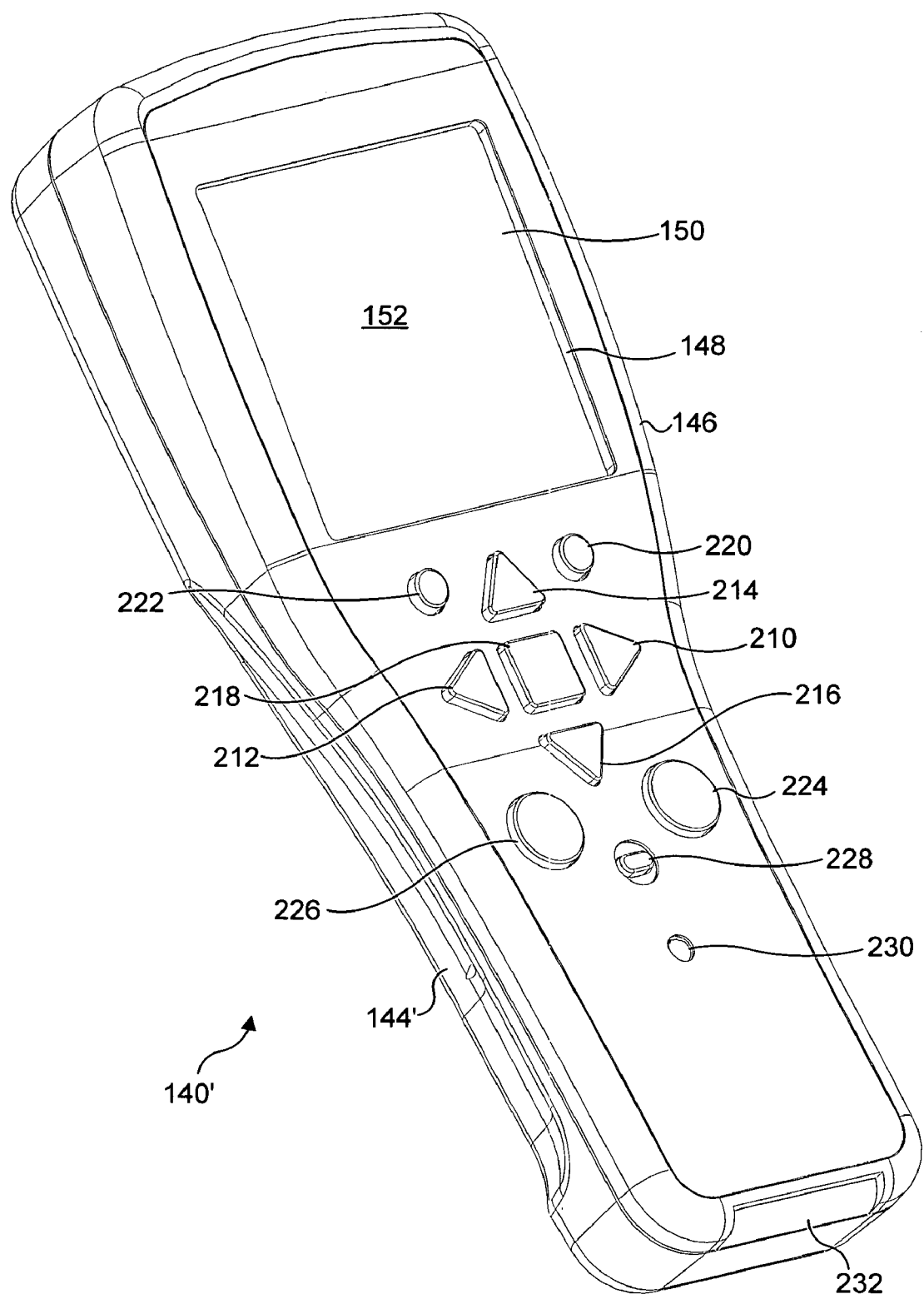
FIG. 11 is an isometric view of the upper surface of either the second or third embodiments.

A portable device 140' is illustrated in FIGS. 10 and 11, and like portable device 140, also includes a light source that can be selectively energized by an operator to illuminate a component that is being inspected, or for other purposes. However, portable device 140' also includes a digital camera 200 that can be selectively activated by a user to record an image, e.g., an image of a component that is being inspected. Accordingly, if an operator makes a decision regarding the safety status of a component or makes a decision to replace a component, a digital image captured by digital camera 200 can provide evidence that justifies the decision made by the operator. Portable device 140' is substantially identical to portable device 140 in most respects, except that it has a lower housing 144' in which digital camera 200 is included. Digital camera 200 has a bezel 202 that supports a lens 204 for receiving light from a component that is being imaged by the digital camera. Not shown is a light sensitive element disposed inside the housing and mounted to an underside of the PC board. The light sensitive element, which may comprise an array of charge coupled devices (CCDs) or a complimentary metal-oxide semiconductor (CMOS), produces digital data corresponding to the light intensity at each pixel within a digital image that is being recorded. Although a higher quality might be achieved with a CCD light sensor, lower cost CMOS light sensors have recently become available that can also be used for the light sensitive device of the digital camera. Such devices are available from a number of different sources and can readily be integrated into portable device 140'.

For purposes of aiming and framing a desired image to be captured by digital camera 200, display 152 is switched to an imaging mode to display an image of the component. When framed as desired, the image shown on the display can be captured in real time, in association with the digital data corresponding to component being imaged and the image data can be stored within memory 64 (FIG. 3) of portable device 140'. It is not expected that an operator will need to record image data for each component being inspected, since only those components having a condition other than okay might need to be photographed with the digital camera, as evidence of the status of the component, should any question regarding the operator's decision subsequently arise. The image data produced by digital camera 200 will likely be stored in a compressed format, such as the Joint Photographic Experts Group (JPEG) format which employs a lossy compression scheme, as is commonly done with other digital cameras. The image data will thus be retained with the other data input by the user during an inspection and will be downloaded to long-term storage with the other data from the inspection.

FIG. 11 illustrates further details of top surface 146 of portable device 140' (and 140). Controls included on the front surface include a Right cursor control button 210, a Left cursor control button 212, an Up cursor control button 214 and a Down cursor control button 216. Centered between these four control buttons is a Read/Enter control button 218, which is depressed when a user wants to enter a selection currently highlighted (selected) on display 152. Since both portable device 140 and portable device 140' include the internal white LED light source, a light power switch 220 is included that can be momentarily depressed by a user to energize the LEDs, to illuminate a component that is being inspected, or to produce light for some other purpose of the operator. Adjacent to Up cursor control button 214 and opposite from light power switch 220 is an Info/Menu button 222 that can be depressed at any time to bring up a current menu on display 152. During the inspection, while viewing the condition of each component being inspected, the user will have an option and will be prompted to press either a green control button 224, which is also pressed to indicate a Yes condition, or a red control button 226, which is also pressed to indicate a No condition.

Neither the second or third embodiments of the portable device include a yellow button. Instead, if the condition of the component is not okay, the operator is simply prompted to select one of several predefined conditions that represent the status of the component being inspected, which can range from a condition in which the component may still be usable, to a condition that justifies immediate repair/replacement of the component. These conditions are presented to the operator on display 152. Using the cursor control buttons, the operator selects the appropriate entry of the condition on the display and depresses Read/Enter control button 218. Furthermore, if the condition of a component is not okay, the operator will be prompted to record a digital image of the component. If the operator presses green button 224 in response to this prompt, display 152 will then switch to the image display mode to show the image that might be captured by digital camera 200. Once the operator has directed lens 204 of the digital camera and positioned the portable device so as to frame the component as desired, as indicated by the image on display 152, the operator depresses Read/Enter control button 218 to capture the image of the component, storing the corresponding image data produced by the digital camera within the memory of the portable device.

A power On/Off switch 228 is disposed between green control button 224 and red control button 226 and slightly offset therefrom. Below the power On/Off switch is a charge indicator 230, for indicating the charge condition of the internal battery supply (not shown) that is contained within the housing of the portable device. A power/data connector port 232 is disposed on an end of the portable device for connecting to an external cradle or docking station, which is discussed in greater detail below. Neither portable device 140 nor portable device 140' include an external stub antenna, as in the first embodiment. Instead, an antenna (not shown) is included internally within the upper and lower housings of the portable device. Use of an internal antenna is preferred, since it avoids potential breakage of an external antenna. It has been determined that an external antenna is not required for sensing RFID tokens. However, like the first embodiment of the portable device described above, portable devices 140 and 140' are used to sense when the portable device is within sufficient range of a token to ensure that the operator is then positioned to inspect a component, to determine the safety status of the component, or to evaluate some other parameter of the component. The other types of tokens and sensors discussed above in connection with the first embodiment of the portable device are also contemplated for use with either the second or third embodiments of the portable device. Accordingly, those options need not be further discussed in regard to portable devices 140 or 140'.

Figure 12:
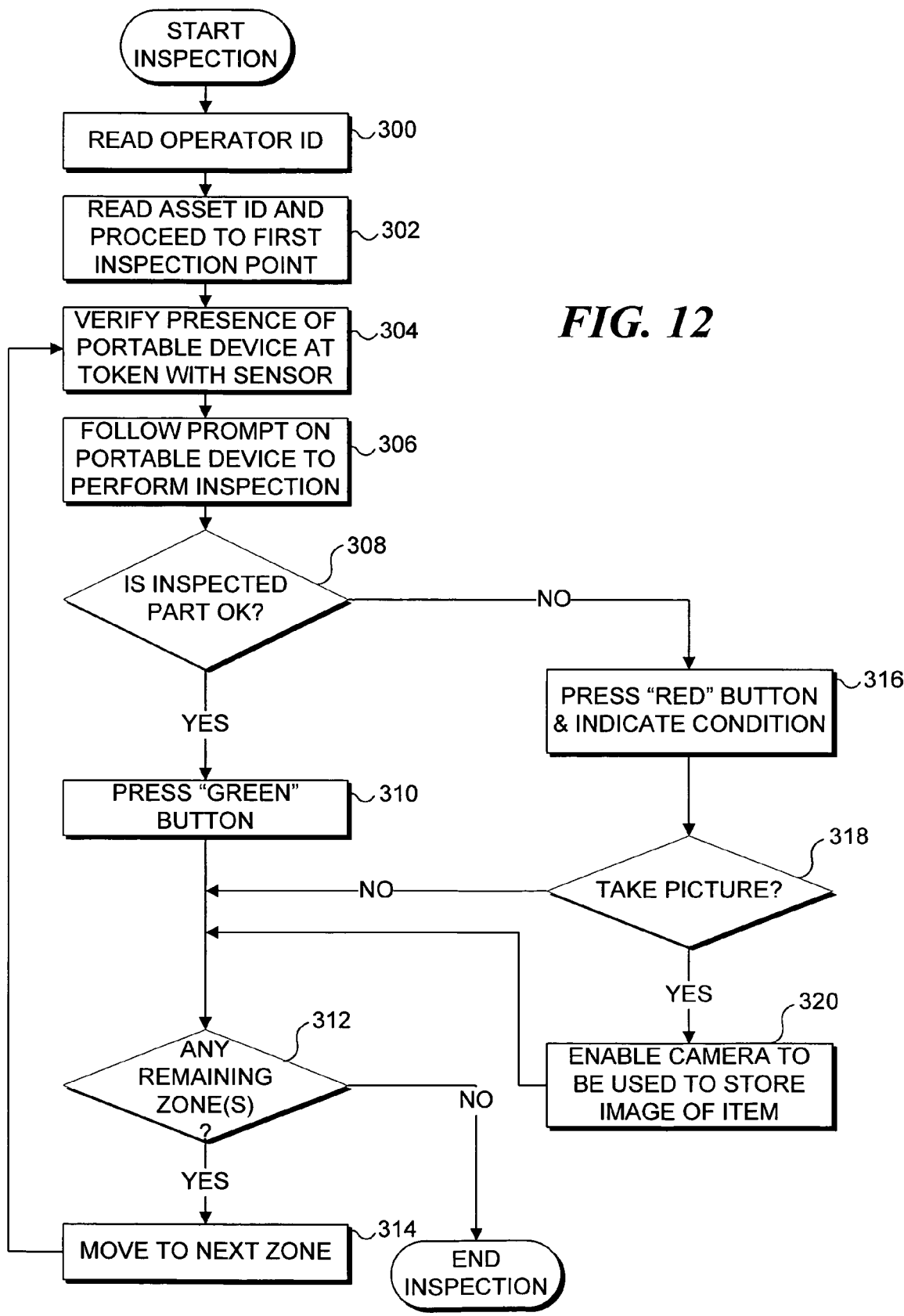
FIG. 12 is a flow chart illustrating the steps implemented during a safety inspection in which the user has an option to record a digital image of a component being inspected.

FIG. 12 illustrates the steps involved in using either portable device 140 or 140' in connection with carrying out an inspection on a vehicle or other type of apparatus or processing facility. Carrying the portable device, an operator starts the inspection, and as indicated in a step 300 uses the portable device to read an operator ID, to input data identifying the operator who is currently using the portable device. This ID can be read from a token associated with the operator, for example, a token that is carried by the operator on a keychain or as a part of a photo identification card. The operator ID is then recorded as part of the data associated with the current inspection and stored in the memory of the portable device for later transmittal and storage at a remote site.

A step 302 then provides that the operator reads an asset ID for the vehicle or apparatus or processing equipment being inspected, which is also stored within the data associated with the current inspection and is provided by a token, which is attached to the asset. Alternatively, the operator might manually enter an asset ID before undertaking the inspection. Having input the asset ID, the operator proceeds to the first inspection point.

In a step 304, the presence of the portable device (and of the operator) is verified at a token fixed adjacent to the first inspection point. The portable device automatically senses the token and stores data providing proof that the operator had physically carried the portable device to the inspection point associated with the token. Next, a step 306 indicates that a prompt to the operator is displayed on the portable device, indicating the next steps of the inspection to the operator. As noted above, a series of inspection steps may be required to complete an inspection of a specific component, or the operator may be prompted to inspect several components that are all associated with the current token. Following step 306, in a decision step 308, the operator determines if the inspected part is okay. If so, the operator presses the green control button on the portable device as indicated in a step 310. A decision step 312 then determines if there are any remaining zones or points to be inspected during the current inspection and if so, a step 314 provides that the operator moves to the next zone or point where one or more components are disposed that require inspection. The logic then returns to step 304. Alternatively, if there are no remaining zones, the operator has concluded the inspection.

Returning to decision step 308, in the event that the inspected part or component is not okay, the operator would press the red control button at a step 316 and as prompted on the display, would enter or select a condition of the component that led the operator to conclude that its condition was not okay. Display 152 on the portable device would then prompt the operator to decide whether to take a picture, at a decision step 318, of the component (this option only applies to portable device 140'). If the operator decides to take a picture of the component, a step 320 enables digital camera 200 to be used to create image data for the item. As described above, display 152 shows the image that is to be recorded in real time, enabling the operator to frame the picture by positioning the portable device relative to the component so that the desired image of the component appears on the display. The operator then presses the Read/Enable control button, capturing the image as it thus appears on display 152, so that the image data are recorded within the memory of the portable device. Thereafter, the logic continues with decision step 312. If the user is employing portable device 140 rather than portable device 140', following step 316, the logic would proceed directly to decision step 312, since there would be no option for taking a picture.

Docking Station

Figures 13, 14, 15:
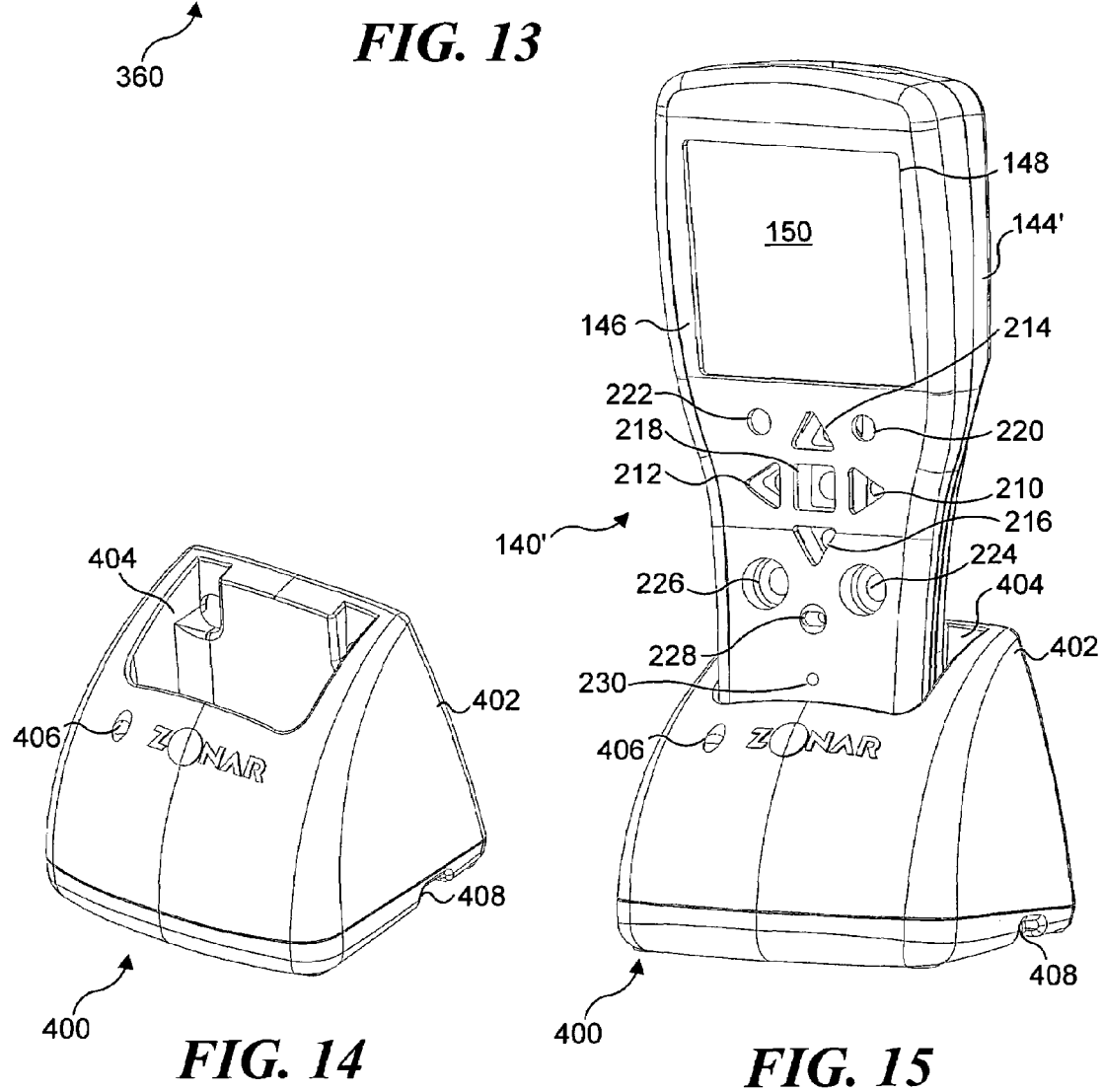
FIG. 13 is a side elevational view of a bus, illustrating the disposition of a token adjacent to a rear of the bus that is scanned to ensure that a driver of the bus has inspected all of the seats to determine whether all passengers have been unloaded from the bus.
FIG. 14 is an isometric view of a docking station for the portable device.
FIG. 15 is an isometric view of the second or third embodiment seated within the docking station for data transfer.
Figure 16:
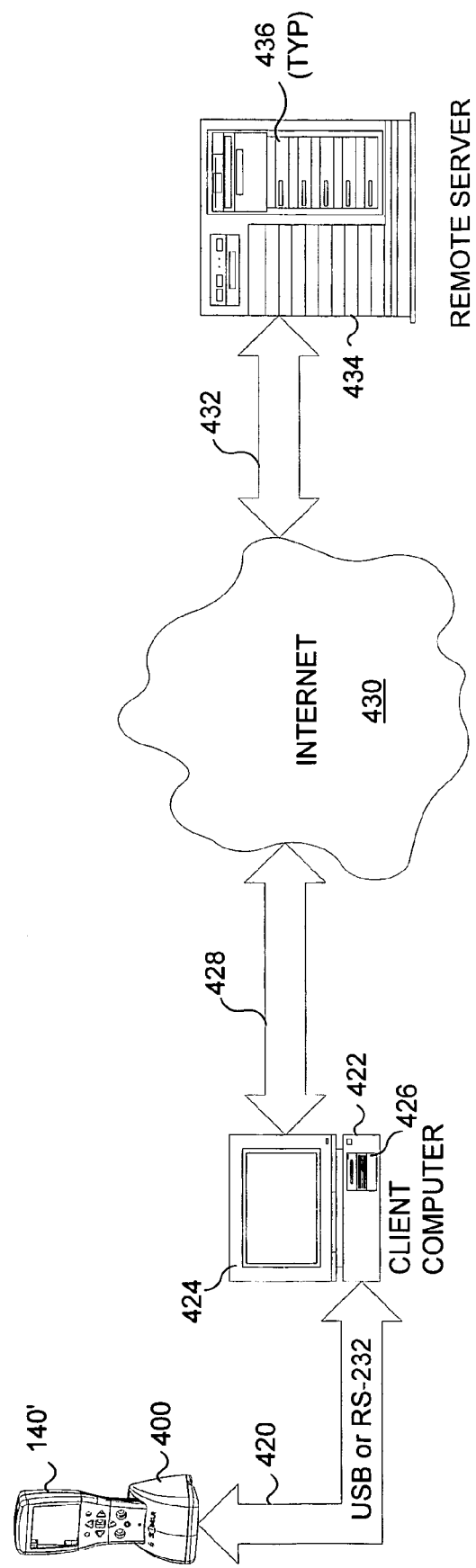
FIG. 16 is a schematic diagram of the system for transferring data over the Internet, between the portable device in the docking station and storage on a remote server.

FIGS. 14 and 15 illustrate a docking station 400 for the portable device of the present invention. Docking station 400 includes a housing 402 having a receptacle 404 into which either portable device 140 or 140' can be fitted. FIG. 15 illustrates portable device 140' inserted within receptacle 404 to facilitate downloading of the data stored within the portable device to a remote storage. The docking station 400 includes an indicator light 406 that changes color to indicate that data are being transmitted from portable device 140 or 140' to another device. Docking station 400 includes an interface circuit that couples the data port on portable device 140 or 140' to a personal computer 422 through a lead 420, as shown in FIG. 16. The interface circuit converts the data format of portable device 140 and 140' to a universal serial bus (USB) or serial RS-232 format for communication with personal computer 422. Accordingly, data link 420 is connected either to the USB port or serial port on personal computer 422 from a port 408 on docking station 400 (see FIGS. 14 and 15). It is also contemplated that other types of computing devices might be used instead of portable computer 422, and other types of data format can be employed. As shown, portable computer 422 has a display monitor 424 and a hard drive 426 for recording data temporarily transferred from portable device 140 and 140'. Subsequently, the data stored on hard drive 426 are downloaded through a data link 428, over Internet 430, and through a data link 432 to a remote server 434, which includes additional storage in the form of a plurality of hard drives 436. It is contemplated that docking station 400 might be disposed in a terminal or other location to which the portable device is returned between inspections or at other times, to transfer data from the memory within the portable device to remote storage on remote server 434.

Data links 428 and 432 can each comprise a telephone modem connection over a telephone network, a wireless data link, a broadband connection through a DSL interface or cable modem, or a cell phone link. Alternatively, personal computer 422 can be directly connected over a local area or wide area network to remote server 434. In general, it is only necessary that the data stored within portable device 140 or 140' resulting from one or more inspections be transferred to a more permanent storage, whether in personal computer 422 or in remote server 434, so that the memory within the portable device is thereafter available to store data from further inspections. By providing remote storage of the data that is downloaded from the portable device from time to time, the security and maintenance of the data are ensured.

FIG. 13 illustrates another aspect of the present invention. For purposes of carrying out safety inspections of a bus 360, which may be a school bus, a last safety check made by the operator (e.g., the driver) might be a check to ensure that all of the passengers have exited from the bus. As shown in FIG. 13, bus 360 includes a plurality of seats 362 at spaced-apart intervals along an aisle 364. To ensure that a child has not fallen asleep or hidden below or behind the seats, at the end of the route, the driver should make a thorough visual inspection of all of the seats in bus 360, which can only be done by walking to the rear of the bus. Accordingly, a token 366 is attached to the back of a seat 368 disposed adjacent to the rear of the bus. By bringing the portable device in proximity with token 366, the operator can thereby confirm that the rear of the bus was visited at the end of a route to ensure that the driver at least had the opportunity to visually confirm that no passengers remained on the bus. Without making such an inspection, it is possible that child might remain on a bus when it is returned to a facility for storage, which at the very least, would cause considerable concern to the parents of the child. Thus, the present invention helps to ensure that the driver is motivated to make an inspection to ensure that no child remains on the bus at the end of a route.

Other Type of Portable Device

While it is likely that an initial preferred embodiment will employ portable device 20, 140, or 140', it is also contemplated that an accessory might be provided for a personal digital assistant (PDA), such as the PALM™ PDA, that would enable the PDA to be used for the same functions as the portable devices discussed above. The accessory to the PDA would include a sensor to detect when the PDA is within the predetermined maximum range from the token associated with the component currently being inspected. The conventional controls on the PDA can be used to make and enter a selection. Furthermore, instead of using a cursor control, it is also contemplated that a touch screen display might instead be used for making selections of menu items and other options presented to the operator. In addition, the PDA would need to be programmed to carry out the functions implemented by the portable devices described above.

Other Applications of the Present Invention

Although the present invention will initially be used in connection with safety inspections of tractors and trailers in the commercial trucking industry, there are many other types of safety inspections unrelated to vehicles in which it is equally applicable. Other types of vehicles besides trucks, such as aircraft and buses, can also benefit from use of the present invention to provide proof that the components of the vehicle have been visited and observed by the operator or other person doing an inspection. Still other applications of the invention are not related to vehicles. For example, in a chemical processing plant or a petroleum refinery it is common for technicians to make periodic safety inspections of valves, gauges, reactors, pressure vessels, and other types of processing equipment and system components to ensure that they are operating properly and within nominal or acceptable limits. During an inspection, a technician may note that a valve is leaking slightly, and schedule it for repair or replacement at a later date. Clearly, if the leak is of a non-hazardous substance and is insignificant in volume, there might well be no reason to shut down the process line in which the valve is installed simply because of the leaking valve. However, if the valve controls an extremely hazardous or toxic substance, even a small leak may be unacceptable. In this case, the technician should immediately report the leaking condition of a valve to a supervisor who would then likely shut down the process or divert the flow of hazardous substance to a different process line to enable the condition to be corrected by immediate replacement or repair of the valve. Additional applications, without any implied limitation, include the inspection of amusement park rides, such as roller coasters, etc., where the condition of many different components of the ride can directly impact on its safety.

While the preceding discussion discloses how a first preferred embodiment of the present invention is used in recording data related to safety inspections of a vehicle, it should be evident that portable device 20, 140 or 140' is readily adapted to recording data from virtually any type of inspection. In the example of a non-vehicular inspection in a chemical processing plant just noted, a technician would be prompted by the portable device to inspect the valve, and once the portable device was within a predetermined distance of the valve, would be prompted to indicate a state of the valve. If the technician depressed either yellow control button 54 or red control button 56 (on portable device 20), or red button 226 (on portable device 140 or 140'), the display would provide a menu of possible conditions from which the technician could select, using the cursor control to select and indicate the observed condition of the valve. Also, other conditions that are not directly related to safety can be recorded with the present invention.

Contemporaneous and Automatic Collection of Ancillary Data During an Inspection

Another embodiment disclosed herein relates to the collection of ancillary data during an inspection. The term ancillary data is intended to refer to data that does more than simply verify that an inspector was present at a particular location, checkpoint, or component during an inspection. For example, in the embodiments described above, wherein a plurality of tokens are affixed to predefined inspection locations, preferably each token will provide a unique ID to the portable device, such that the records stored by the portable device can be used to determine each location that was visited during an inspection. If data corresponding to particular token or location is missing from the record generated by the handheld device during the inspection, such an occurrence can indicate that the particular token or location was not visited by the inspector during the inspection (of course such an omission could also indicate that there was a communication failure between that token and the portable device). Such ID data is not ancillary data, because the only function of the ID data is to verify that an inspector was present at a particular location or component. In contrast, ancillary data is intended to represent data that has an additional utility. For example, a sensor may be disposed in proximity of the component or location to be inspected. Data collected by such a sensor represents ancillary data, because such data does more than uniquely identify a particular location or component that was to be visited during an inspection. In accord with one exemplary embodiment, during an inspection, ancillary data will be collected from at least one location or component during an inspection. It should also be recognized that the ancillary data can be collected by a sensor disposed at a location other than the location of a token configured to convey the ancillary data to a portable device. While most often the ancillary data will likely be generated proximate the location where the ancillary data is conveyed to the portable device, it should be recognized that such a requirement is not a limitation of the concept described herein. Thus, ancillary data can be collected from a first location, but conveyed to a portable device from a different location, as long as a logical connection is provided between the sensor and the token or other unit configured to convey the ancillary data to the portable device.

Thus, another embodiment described herein relates to extracting data stored in a token using a portable reader generally consistent with those described above (i.e. portable device 20, 140 or 140'). It should be understood that while in one embodiment the extraction of ancillary data using a portable reader encompasses using a portable reader to extract data from a modified token (a token including a memory or coupled with a memory), the overall concept of collecting ancillary data during an inspection presented herein also encompasses conveying ancillary data from a sensor to a portable reader, regardless of whether the sensor is considered a token. While in a particularly preferred implementation the portable reader will extract the data from the sensor/token without requiring a physical connection between the sensor/token in the portable reader, the concept disclosed herein also encompasses embodiments in which a physical connection must be made between the portable reader and the sensor/token in order to extract data from the sensor/token. The IBUTTON™ computer chip, discussed above, represents an exemplary data interface that requires a physical connection with a portable reader to extract data. Of course, conventional data ports including serial ports, parallel ports, and USB ports can be used to implement a data interface requiring a physical connection with a portable reader, such that a portable reader can extract data from a sensor/token. It should thus be understood that the disclosure presented herein further encompasses a modified token or sensor configured to 1) collect ancillary data; 2) store ancillary data; and 3) enable the stored ancillary data to be automatically conveyed to a portable reader. FIGS. 17-20 relate to the collection and conveyance of ancillary data in accord with another aspect of the concept disclosed herein.

Figure 17A:
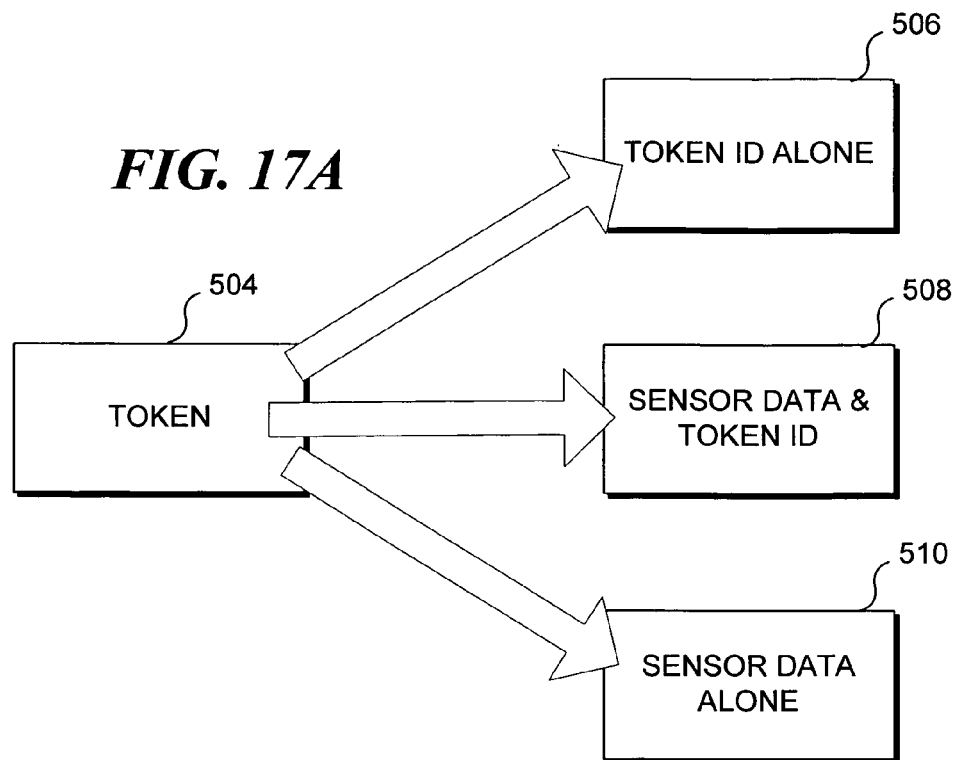
FIG. 17A is a schematic block diagram indicating three different types of data that can be collected by the portable device in accord with yet another embodiment described herein.

FIG. 17A is a block diagram schematically illustrating three different types of data that can be collected by the portable devices described herein during an inspection, in which ancillary data are collected contemporaneously with the inspection. It should be understood that consistent with the above discussion, token 504 can be implemented using a number of different components enabling data to be exchanged between the token and the portable device. While an RFID tag represents one type of token that is particularly useful for this purpose, it should be understood that the concepts disclosed herein are not limited to embodiments where tokens are implemented as RFID tags.

Token 504 can be configured to provide a token ID alone, as indicated in a block 506. As discussed above, token IDs enable individual tokens to be uniquely discriminable, such that a record stored in the portable device of a specific token ID will indicate that the user of the portable device was proximate that specific token during an inspection. As discussed in greater detail below, token 504 can be configured to communicate both ancillary data (such as sensor data) and a token ID to a portable device, has indicated in a block 508. Alternatively, token 504 can be configured to communicate only the ancillary data to a portable device, as indicated in a block 510.

Figure 17B:
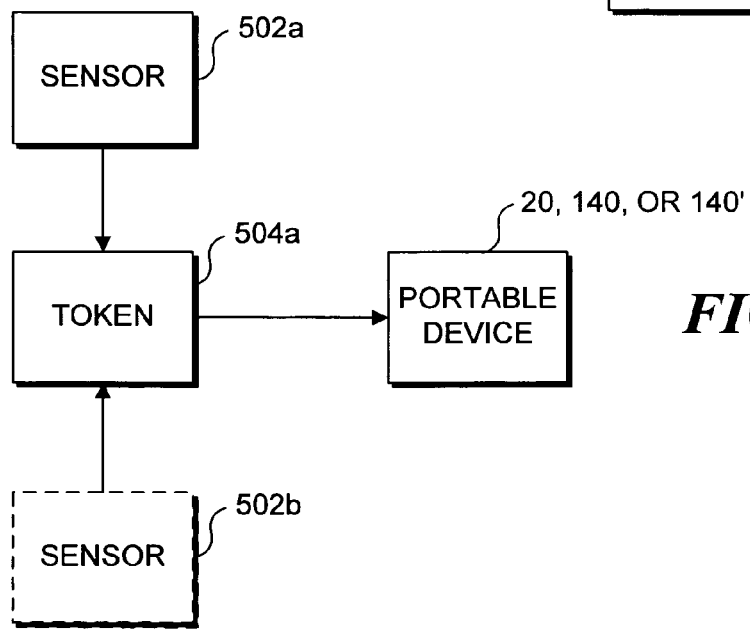
FIG. 17B is a schematic block diagram of a sensor configured to collect ancillary data logically coupled to a token, thereby enabling the portable device to automatically collect ancillary data during an inspection.

FIG. 17B is a block diagram schematically illustrating a sensor 502a logically coupled to a token 504a, such that when a portable device consistent with those described herein is proximate token 504a, the portable device will automatically collect both token ID data and ancillary data that have been collected by sensor 502a. It should be understood more than one sensor can be logically coupled to a single token, as indicated by optional sensor 502b.

Figure 17C:
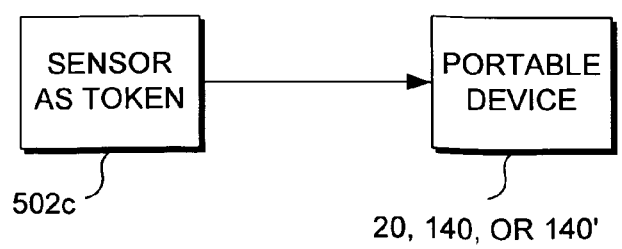
FIG. 17C is a schematic block diagram of a sensor configured to collect ancillary data and to communicate with the portable devices described herein, thereby enabling the portable devices to automatically collect ancillary data during an inspection.

FIG. 17C is a block diagram schematically illustrating a sensor 502c acting as a token, such that when a portable device consistent with those described herein is proximate sensor/token 502c, the portable device will automatically collect ancillary data collected by sensor/token 502c, but without also collecting any unique token ID. Such a configuration can be implemented when the data collected by the sensor uniquely identifies a location associated with the inspection so that an ID is not required. For example, if one inspection location specified for a vehicle inspection corresponds to an engine compartment of the vehicle, and sensor/token 502c is configured to collect engine data (e.g., one or more parameters such as oil level, oil temperature, coolant temperature, etc.), and no other engine data are collected in any other part of the inspection, the presence of such engine data in the record generated by the portable device during the inspection will provide evidence that the inspector was proximate sensor/token 502c during an inspection of the vehicle. Thus, if ancillary data collected during an inspection can uniquely identify a particular location, then a token ID need not be collected by the portable device while the operator is inspecting that location. With respect to implementing sensor/token 502c, it should be understood that sensor/token 502c encompasses any type of sensor configured to communicate with a portable device, as well as a sensor logically coupled to a token configured to communicate with the portable device, where the token is not configured to provide a unique token ID to the portable device. All possible combinations of the sensor/token embodiments illustrated in FIGS. 17A-17C are also contemplated as being useful during inspections with the portable devices, where the token/sensor at one or more locations included in an inspection can correspond to the token/sensor embodiment in any of these three Figures.

Accordingly, FIG. 18 schematically illustrates a public transportation vehicle including a plurality of tokens, some of which are configured to convey to a portable device only a token ID, some configured to convey to a portable device only ancillary data, and some configured to convey to a portable device both a token ID and ancillary data. It should be understood that the concepts disclosed herein are not limited to application with any specific type of public transportation vehicle, and can be equally applied to vehicles such as trains, marine vessels, and aircraft. Furthermore, the broad concept of collecting ancillary data contemporaneously with an inspection, while using a portable device that provides a record of locations that were visited during an inspection, can be implemented for any type of inspection, and is not limited to an inspection of a vehicle. Thus, the exemplary embodiment disclosed with respect to FIG. 18 should not be considered to limit the applicability of the concepts disclosed herein.

Public transportation vehicle 512 is a bus, which includes a plurality of tokens 514, which are positioned in overhead luggage compartments 516. The purpose of tokens 514 is to ensure that an inspector was positioned proximate to each overhead luggage compartment during an inspection. When one of the portable devices disclosed herein is positioned proximate to any of tokens 514, the portable device will collect a unique token ID from each token 514, providing a record that the inspector was proximate to each of the overhead luggage compartments where the token is disposed. While not providing proof that the inspector actually inspected each luggage compartment, such a record does provide proof that the inspector was proximate to the overhead luggage compartments and could readily have inspected the overhead luggage compartment. Clearly, it is intended that, while proximate to each of the overhead luggage compartments, the inspector will search for any contraband, toxic material, explosive material, or any other undesirable or other materials that may have been left behind by the last group of passengers to use vehicle 512. This inspection will provide assurance to the next group of passengers that the vehicle is safe for their use. Note that tokens 514 are configured to communicate only a token ID to the portable device. It should be understood, however, that other types of inspections, and not simply inspections designed to minimize terrorist threats, are encompassed by the concepts disclosed herein and defined by the claims that follow.

Vehicle 512 also includes a plurality of tokens 520, each of which are generally positioned underneath a different group of seats 518. The purpose of tokens 520 is to ensure that an inspector was positioned proximate to each group of passenger seats during an inspection. When one of the portable devices disclosed herein is positioned proximate to any of tokens 520, the portable device will collect a unique token ID from that token, providing a record that the inspector was proximate to the corresponding group of passenger seats in the vehicle. Again, while not providing proof that the inspector actually inspected a group of seats, such a record does provide proof that the inspector was proximate to the seats in the group. It is the intention that, while proximate to each group of passenger seats, the inspector again will search for any contraband, toxic material, explosive material or any other undesirable or other materials that may have been left behind by the last group of passengers to use vehicle 512. This actual inspection will provide assurance to the next group of passengers that the vehicle is safe for their use. Note that tokens 520 are configured to communicate only a token ID to a portable device.

Vehicle 512 were further includes a plurality of tokens 522, each of which are positioned proximate to the vehicle tires 523. Significantly, each token 522 is logically coupled to a sensor 524. Those of ordinary skill in the art will recognize that sensors 524 can be configured to collect a wide variety of data related to vehicle tires, which vehicle maintenance personnel may have an interest in having collected contemporaneously with an inspection of the vehicle. For example, sensors 524 can be configured to collect tire pressure data, data related to the wear of brake components associated with the tire, tire temperature data, or various combinations of different types of data values. Each token 522 is configured to communicate to a portable device (consistent with those described above) both a token ID, as well as ancillary data collected by sensors 524. The token ID can be used to correlate specific ancillary data to a specific tire. Thus, if the record automatically collected by the portable device indicates that a specific one of the vehicle's tires is seriously under inflated, the token ID associated with the ancillary data can be used to identify which tire needs attention. Those of ordinary skill in the art will recognize that once such data have been collected, a plurality of different techniques can be used to manage the data. For example, the portable device can be configured to provide a warning to the inspector that the ancillary data identify an unsafe condition that needs to be addressed before the vehicle can be placed into service. Furthermore, if the portable device is equipped to connect to a data management service (such as vehicle fleet management database, as are used by many operators of fleets of vehicles) via a remote transmission, once such an unsafe condition has been indicated in the ancillary data, the portable device can communicate the unsafe condition to the data management service. Operators at the data management service can then implement one or more appropriate responses, such as dispatching a repair crew to deal with the unsafe condition, or documenting that the vehicle is unfit for service and dispatching a replacement vehicle.

It should be recognized that many types of sensors collecting many different kinds of ancillary data are encompassed by the concept provided herein. Other sensor/token combinations can include (without limitation) combinations configured to detect and convey vehicle mileage data, vehicle engine parameters (including engine hours), fluid levels and consumption rates, equipment parameters, environmental conditions, positional/location information, etc. The specific sensors noted above are intended to be exemplary, rather than limiting, since almost any type of sensor can be used.

Vehicle 512 also includes at least one token 526, which is configured to communicate only ancillary data to a portable device (consistent with the description above with respect to FIG. 17C). As noted above, if ancillary data communicated by token 526 uniquely identify the location associated with an inspection, then no token ID need be communicated to a portable device for the location. As indicated in FIG. 18, token 526 is disposed in the front of vehicle 512, generally proximate to the vehicle operator's seat (i.e., generally near the steering wheel and other vehicle controls). Those of ordinary skill in the art will recognize that many vehicles are equipped with onboard computers to measure and manage regular vehicle operating conditions, such as engine parameters, and in some vehicles, other vehicle subsystems as well, including brake systems, engine power transmission systems, fuel systems, and suspension systems. Thus, token 526 can be configured to communicate a variety of ancillary data collected by the onboard computer to a portable device, while the inspector is inspecting a particular portion of the vehicle, such as a driver's seat location. Some vehicles are equipped with positioning systems, such as global positioning satellite (GPS) based systems for determining the location of the vehicle. The ancillary data provided by token 526 can also include such positioning data. Note that while token 526 does not communicate a token ID to a portable device responding to the proximity of token 526, the ancillary data from token 526 can be easily differentiated from any other ancillary data collected during the inspection, thereby providing evidence that an inspector was proximate token 526 during an inspection. It should be understood that tokens communicating only ancillary data to a portable reader/device configured to communicate with the token are not limited to being implemented in any specific location, as long as ancillary data communicated to a portable reader by such a token can be used to uniquely identify that location in an inspection. Thus, the description of token 526 contained herein is intended to be exemplary, rather than limiting. Also, in some types of inspections, the data may not necessarily be of a nature that uniquely indicates the inspection was made of a specific location, but will at least indicate the data have been collected by the inspector.

In particular, with respect to the pre-trip inspection reports discussed in detail above, operators of commercial vehicles require data about their vehicles to properly manage their fleets. If such ancillary data can be automatically collected contemporaneously with a required vehicle inspection, operators of such vehicles will be able to collect valuable data with no additional effort. The only effort required is to equip their vehicles with sensors configured to collect the ancillary data, and tokens configured to communicate that ancillary data to the portable reader. Once a vehicle has been thus modified, ancillary vehicle data can be automatically collected during each inspection. With respect to pre-trip vehicle inspections, ancillary data that fleet operators are likely to desire include one or more of the following: tire pressure data for each vehicle tire, tire temperature data (e.g., maximum temperature for each vehicle tire), brake condition data (such as brake stroke data), engine hour data, fuel level data, fuel consumption data, oil temperature data, oil level data, coolant temperature data, coolant level data, engine temperature data, and vehicle location data (i.e., GPS data).

It must be emphasized that the term "ancillary data" is intended to encompass a wide variety of different types of data. Indeed, the type of ancillary data communicated to a portable device during an inspection will largely be a function of the type of inspection that is being conducted. If the inspection is related to a vehicle, the ancillary data will likely involve data relating to the condition of the vehicle or one of the components or subsystems comprising the vehicle. If the inspection is related to a building, the ancillary data will likely involve data relating to a condition of the building, or one of the building's subsystems (such as an alarm system, a computer system, a heating system, a cooling system, etc.). Generally, ancillary data encompass any data other than static data that uniquely identify a specific token.

While RFID tags represent a particularly useful token implementation, it should be recognized that currently available RFID tags generally have a relatively low baud rate for transfer of data. To accommodate this relatively low data transfer rate, RFID tags configured to communicate ancillary data can be selected to provide a plurality of outputs based on a single request for data. For example, a standard RFID tag can hold ten 4-bit nibbles of data. In order to send more data across the RFID link, a protocol can be provided that enables multiple transmissions of RFID data over the RFID data link (preferably, a 125 kHz link). An exemplary protocol will separate the data to be transmitted into a plurality of subsets. During an initial read, the RFID data link identifies the number of additional reads that will be transmitted, based on a single request for data. Subsequent reads will transmit subsets of the data collected. For example, if the data to be transmitted include token identification data, tire pressure data, and tire temperature data, each of those different types of data can be considered a subset, to be transmitted as a separate read. If more than one subset of data can be transmitted in a single read, then fewer reads than the number of subsets can be employed.

While a data interface is readily implemented enabling data to be communicated between a token or sensor and one of the portable devices described herein using an RFID tag, it should be understood that the present disclosure is not thus limited. The IBUTTON™ computer chip discussed above could also be used to implement the data interface (i.e., the IBUTTON™ computer chip might be used to simultaneously implement the controller, the memory, and the data interface). Furthermore, it should be recognized that such a data interface can be implemented with conventional data ports, including any of a parallel port, a serial port, a USB port, and a proprietary data port.

As noted above, with respect to using a portable device as described herein to automatically collect ancillary data contemporaneously with an inspection, some mechanism must be provided for enabling data to be conveyed from a token or a sensor disposed proximate a location to be inspected, to the portable device. As schematically illustrated in FIG. 19, an exemplary ancillary data conveying token 600 includes a data interface 602, a controller 604, and a memory 606 (preferably nonvolatile). Preferably, a housing 622 encloses data interface 602, controller 604, and memory 606, although if the data conveying token is placed in a protected location (such as within the cab of a vehicle), the housing is optional and not required. In one implementation, housing 622 is waterproof and shock resistant, so that token 600 can be secured to the exterior of a vehicle or location to be inspected.

Controller 604 is central to the data conveying token. The controller communicates bi-directionally with data interface 602, and memory 606. In addition, the controller is also logically coupled to one or more sensors 614, which are configured to collect ancillary data to be conveyed to a portable reader by token 600 when the portable reader is in close proximity to the token, generally as described above. As discussed above with respect to FIG. 18, examples of useful sensors are include a tire pressure sensor 616, a tire temperature sensor 618, and a brake condition sensor 620. It should be understood, however, that such sensors are intended to be exemplary, rather than limiting the applicability of the present disclosure. Preferably, the controller is implemented as a microprocessor, such as a central processing unit (CPU) that executes a software program comprising machine instructions stored in the memory. Alternatively, the controller may be implemented using an application specific integrated circuit (ASIC). In either case, the controller is configured to execute a plurality of functions. Those functions will typically include determining when the portable reader/portable device is sufficiently close to token 600 to convey the ancillary data to the portable device (this function can be implemented by recognizing an interrogation signal received from portable device), and if the amount of ancillary data exceeds a data transfer rate achievable by token 600, formatting the ancillary data such that data transmission can be achieved using a plurality of separate data transmissions based on a single request for data from the portable device, generally as described above.

Where the controller includes a microprocessor, memory 606 can be used to store machine instructions for enabling the microprocessor to implement the plurality of functions described above, as well as for storing the ancillary data.

Data interface 602 enables data to be extracted from the metering device. In a preferred embodiment, the data interface is implemented as an RFID tag, enabling data to be extracted without requiring a physical connection between the data interface and the portable reader. Ancillary data conveying tokens that implement data interface 602 using an RFID tag can be read using any of portable devices 20, 140, or 140'. While an initial prototype has implemented data interface 602 using an RFID tag, it should be understood that the concept is not thus limited. The IBUTTON™ computer chip discussed above could also be used to implement the data interface (i.e., the IBUTTON™ computer chip might be used to simultaneously implement the controller, the memory, and the data interface). Furthermore, it should be recognized that data interface 602 can be implemented with conventional data ports, including any of a parallel port, a serial port, a USB port, and a proprietary data port.

With respect to the disclosure provided above relating to the use of the token and a portable reader, it should be understood that data interface 602, controller 604, and memory 606, can be collectively considered as a "token." Although not like the other types of tokens discussed above, these components interact with a reader that is used to extract data through the data interface and thus to that extent, function like these other types of tokens.

In one implementation, the data interface discussed above is implemented using a coil. Those of ordinary skill in the art will recognize that RFID tags convey data using a coil. Commercially available devices including a memory, a coil (and sometimes an integrated processor) are referred to as transponder interfaces. Particularly preferred transponder interfaces, such as types U3280M™ or U3280B™, are available from Amtel Corp. of San Jose, Calif. Amtel also provides a transponder interface that includes an integrated controller, the U9280M-H™, which would avoid the need for a separate microprocessor. It should be understood that similar products from other vendors can be employed, and the present disclosure is not intended to be interpreted as being limited to a specific transponder interface integrated circuit. Furthermore, it should also be recognized that the data conveying token described above is intended to be exemplary, rather than limiting. Those of ordinary skill in the art will recognize that many different possibilities exist for conveying data to a portable device during an inspection. As noted above, data can be conveyed from a token or other component to a portable device via wireless communication or by a hardware link between the component conveying the data and the portable device. The concept of collecting ancillary data during an inspection is not limited to any specific technique for conveying data from a component disposed at a location associated with an inspection, and the portable device used to generate a record of the inspection. It should also be recognized the term token as used herein is intended to be interpreted broadly. Tokens represent any type of component that can be detected by a sensor in the portable device. Some tokens are configured to convey identifying data to the portable device, such as a token ID. Other tokens are configured to convey only ancillary data to a portable device. Still other tokens are configured to convey both ancillary data and a token ID to a portable device. Exemplary tokens include RFID tags and IBUTTON™ computer chip, although such examples are simply intended to be exemplary, rather than limiting on the scope of this disclosure.

With respect to tokens configured to convey ancillary data and no token ID, it should be recognized that an inspection could involve inspecting locations in which every single token is configured to convey only ancillary data and no token ID, in which case, the ancillary data itself provides not only the additional information comprising the values included in the data, but also provides data that can be used to verify that an inspector was proximate each location or component included in the inspection. This conclusion would require that the ancillary data conveyed by each token be sufficiently unique to enable that data to be distinguishable from data conveyed by other tokens disposed at other locations or components involved in the inspection. For example, consider an inspection of a restaurant, in which the restaurant owner wants an inspection to be performed nightly to determine that the stove have been turned off (to avoid an accidental fire), that the refrigeration unit is working properly (to avoid spoilage of food products), and that the safe has been secured (to prevent employees or others from being tempted to commit a theft). The closing manager is tasked with using a handheld device such as those described above to perform this inspection every night before leaving. A token proximate to the stove can be configured to convey ancillary data to the handheld device indicating whether the stove is on or off. The token proximate to the refrigeration unit can be configured to convey ancillary data to the handheld device indicating the ambient temperature in the refrigerator. The token proximate to the safe can be configured to convey ancillary data to the handheld device indicating whether the safe is locked. At the end of the inspection, if the inspection has been properly executed, the record generated by the handheld device will include: a value indicating whether the stove gas valve has been turned off or left on (corresponding to the state of the stove), a temperature value (corresponding to the temperature inside the refrigerator), and a value indicating whether the safe is locked or open (corresponding to the state of the safe). If the record contains no temperature value, it can be inferred that the manager failed to inspect the refrigerator. If the record contains no value for the stove gas valve, it can be concluded that the manager failed to inspect the stove. Similarly, if the record contains no value indicating the locked state of the safe, it can be concluded that the manager failed to inspect the safe.

Method of Automatically Collecting Ancillary Data During an Inspection

FIG. 20 is a flow chart 530 schematically illustrating a sequence of logical steps employed in using a portable device consistent with those described herein to collect ancillary data during an inspection. From a start block 532, a first step optional step is to enter an operator identification number (ID) into the portable device, as indicated in a block 534. As discussed in detail above, it would be desirable to be able to identify a particular individual conducting an inspection, so if the record generated by the portable device during the inspection indicates that a particular location was missed during an inspection, feedback can be given to the correct individual, to ensure that future inspections are conducted more thoroughly.

Once the operator ID is entered (if required), the portable device prompts the operator to proceed to a first inspection point as indicated by a block 536. A decision block 538 determines if the portable device has detected the token associated with the component or location that is to be inspected, by determining if a token ID has been detected. If not, then the logic determines if the portable device has detected any ancillary data being conveyed to the portable device, as indicated in a decision block 544. If not, the logic loops until either a token ID or ancillary data is detected, indicating that the portable device is disposed proximate to the token or sensor configured to provide at least one of a token ID and ancillary data to the portable device.

Referring to decision block 538, once the portable device has detected a token ID, the token ID is stored in the memory in the portable device, as indicated a block 540. In a decision block 542, the logic determines if any ancillary data are also being detected, along with the token ID (as discussed in detail above, some tokens are configured to convey both token ID and ancillary data to a portable reader, while other tokens are configured to convey only ancillary data, or only a token ID). If ancillary data are detected, the ancillary data are stored in the memory, as indicated in a block 546.

Referring to decision block 544, once the portable device has detected ancillary data, the ancillary data are stored in the memory in the portable device as indicated in block 546. Regardless of which path is traversed to reach block 546, the portable device then prompts the operator to perform the inspection of the location or component proximate to the token, as indicated by a block 548. As discussed in detail above, the portable device may give specific prompts to the operator indicating the conditions or components that are to be inspected. In the context of inspecting public transportation vehicles to minimize terrorist threats, the portable device will likely prompt the operator to look for unattended packages, bags, or containers, which may contain explosive devices, or toxic materials.

In a decision block 550, the controlling logic determines if there are further inspection points or locations in the inspection currently being carried out. If not, the data collected by the portable device (the ancillary data and the record of the token ID's recognized during the inspection) are transmitted or uploaded into storage at a remote site, as indicated in a block 554. As discussed in detail above, this step can be executed immediately after the inspection is completed, or at some later time, perhaps after additional inspections have been completed, and/or after the portable device has been inserted into the external cradle or docking station. Once the data are transmitted to the remote site for long-term storage, the process is complete.

Assuming that further inspection points remain in the inspection at decision block 550, a block 552 indicates that the operator is to proceed to the next inspection point, which will again preferably be determined by a prompt displayed to the operator on a display of the portable device. The logic then loops back to decision block 538, which determines if the sensor on the portable device has detected a token ID, indicating that the portable device is within the predefined maximum range of the token, thus ensuring that the operator is sufficiently close to the component to inspect it.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for providing a record on a portable device that a location was visited during an inspection, while contemporaneously collecting ancillary data on the portable device, comprising the steps of:
   (a) affixing a token adjacent to the location, the token having been selected from a group consisting of:
      (i) a token comprising a radio frequency transponder that is excited by radio frequency energy emitted by the portable device, producing an altered radio frequency signal that is detected by the portable device;
      (ii) a token comprising a pattern of magnetic flux, wherein the portable device detects the pattern of magnetic flux from the token to produce a signal indicative of a specific type of component associated with the token; and
      (iii) a token comprising an optical pattern, wherein the portable device detects the optical pattern of a token to produce a signal indicative of a specific type of component associated with the token;
   (b) enabling an operator to move the portable device proximate the location;
   (c) in response to the portable device responding to the token to detect being moved proximate the location, automatically producing a record stored within the portable device that the portable device was proximate the location, said record providing evidence that the operator was sufficiently close to the location to perform an inspection at the location; and
   (d) further in response to the portable device being moved proximate the location, automatically transferring and storing the ancillary data in the recording device, said ancillary data having been collected by a data collection device disposed proximate the location.

2. The method of claim 1, further comprising the step of logically coupling the token to the data collection device, such that when the operator moves the portable device proximate the token, the portable device automatically produces the record and stores the ancillary data.

3. The method of claim 2, wherein the step of logically coupling the token to the data collection device comprises the step of coupling the token to at least one of:
   (a) an odometer;
   (b) an hour meter;
   (c) a brake condition sensor;
   (d) an engine sensor;
   (e) a temperature sensor;
   (f) a pressure sensor; and
   (g) a position sensor.

4. The method of claim 1, further comprising the step of affixing a plurality of tokens adjacent to a corresponding plurality of other locations that are to be visited during the inspection, each of the plurality of tokens being associated with and affixed adjacent to a different one of the plurality of other locations and causing the portable device to detect when it is proximate the other location associated with the token, to identify said other location, producing the record indicating that the operator was sufficiently close to the other location to perform an inspection at the other location.

5. The method of claim 1, wherein the ancillary data relates to at least one of:
   (a) an odometer reading;
   (b) an hour meter reading;
   (c) a brake condition;
   (d) an engine condition;
   (e) a temperature;
   (f) a pressure; and
   (g) a geographical position.

6. The method of claim 1, further comprising the step of transferring the record and the ancillary data from the portable device to a storage that is separate from the portable device.

7. A method for using a portable device for collecting ancillary data that include data values of interest and indicate that a location was visited during an inspection, comprising the steps of:
   (a) providing a portable device for use in recording ancillary data related to the inspection, said portable device being capable of receiving the ancillary data from a data collection device that is disposed proximate the location, only when the portable device is also disposed proximate the location, the ancillary data having been collected by the data collection device; and (b) enabling an operator to move the portable device proximate the location, such that the portable device automatically interrogates the data collection device, causing the ancillary data to be transferred to the portable device and thereby providing evidence that the operator was sufficiently close to the location to perform the inspection at the location.

8. The method of claim 7, wherein the step of enabling the operator to move the portable device proximate the location comprises the step of automatically transferring ancillary data to the portable device relating to at least one of:
(a) an odometer reading;
(b) an hour meter reading;
(c) a brake condition;
(d) an engine condition;
(e) a temperature;
(f) a pressure; and
(g) a geographical position.

9. The method of claim 7, further comprising the step of transferring the ancillary data from the portable device to a storage that is separate from the portable device.

10. The method of claim 7, further comprising the step of logically coupling the data collection device configured to collect the ancillary data to at least one of:
(a) an odometer;
(b) an hour meter;
(c) a brake condition sensor;
(d) an engine sensor;
(e) a temperature sensor;
(f) a pressure sensor; and
(g) a position sensor.

11. The method of claim 7, further comprising the step of positioning the data collection device proximate the location before the inspection, the data collection device being coupled to a data transfer device to transfer the ancillary data to the portable device when interrogated, the data transfer device comprising at least one of:
(a) a radio frequency transponder that is excited by radio frequency energy emitted by the portable device, producing an altered radio frequency signal that is detected by the portable device;
(b) a token providing a pattern of magnetic flux, wherein the portable device detects the pattern of magnetic flux provided by the token to identify a specific type of component associated with the token; and
(c) an optically readable token having an optical pattern, wherein the portable device detects the optical pattern to produce a signal indicative of a specific type of component associated with the optically readable token.

12. The method of claim 11, further comprising the step of affixing a plurality of data transfer devices adjacent to a corresponding plurality of other locations that are to be visited during the inspection, each of the plurality of data transfer devices being associated with and affixed adjacent to a different one of the plurality of other locations, each data transfer device being configured to transfer at least one type of ancillary data collected by a data collection device with which the data transfer device is coupled and identification data to the portable device when the portable device is proximate the other location associated with the data transfer device to identify the other location, such that the at least one type of ancillary data and identification data received by the portable device while proximate to the other location provides evidence that the operator was sufficiently close to the other location to perform the inspection at the other location.

13. A system for providing evidence that a plurality of locations were visited during an inspection, comprising:
(a) a plurality of tokens, each token being associated with a different location that is to be visited during the inspection and affixed adjacent to the location, each token being configured to provide at least one of unique identification data that uniquely identifies the token, and at least one of the tokens being adapted to transfer ancillary data that have been collected by a data collection device to which the token is adapted to be coupled; and
(b) a portable device adapted to be transported to each location to be visited and inspected during the inspection, said portable device including:
(i) a housing;
(ii) a memory in which machine instructions and data are stored;
(iii) a sensor for detecting when the portable device is proximate each of the plurality of tokens, and thus within a predetermined maximum distance from each of the locations associated with the plurality of tokens, said sensor producing a signal indicating when the portable device is within the predetermined maximum distance from any of the locations;
(iv) a reader configured to collect ancillary data when the portable device is proximate any of the plurality of tokens that are coupled to a data collection device, and thus within the predetermined maximum distance from the location associated with the token, the reader responding to the signal that is produced by the sensor, by receiving the ancillary data from the token; and
(v) a controller coupled to the memory, the reader, and the sensor, said controller executing the machine instructions and, in response to the signal produced by the sensor, causing the memory to store data indicative of each location visited during the safety inspection, the stored data comprising the unique identification data and any ancillary data transferred from the token at the location.

14. The system of claim 13, wherein the sensor and reader are implemented as a single component.

15. The system of claim 14, wherein the single component comprises a radio frequency receiver.

16. A system for providing evidence that a plurality of locations were visited during an inspection, comprising:
(a) a plurality of tokens, each token being associated with a different location that is to be visited during the inspection and affixed adjacent to the location, each token being configured to convey ancillary data collected by a data collection device adapted to be coupled to the token, the ancillary data conveyed by each token being uniquely discriminable and associated with only one of the plurality of locations to be inspected with which the token is associated; and
(b) a portable device adapted to be transported to each location to be visited and inspected during the inspection, said portable device including:
(i) a housing;
(ii) a memory in which machine instructions and data are stored;
(iii) a reader configured to collect ancillary data conveyed by any of the plurality of tokens when the portable device is proximate the token, and thus within a predetermined maximum distance from the location with which the token is associated, the reader receiving the ancillary data, said ancillary data being indicative that the portable device is within the predetermined maximum distance from said location; and (iv) a controller coupled to the memory, the reader, and the sensor, said controller executing the machine instructions and, in response to the signal produced by the sensor, causing the memory to store the ancillary data that are indicative of each location visited during the inspection, as the ancillary data for the location are collected by the reader.

17. A method for providing a record on a portable device that a location was visited during an inspection, while contemporaneously collecting ancillary data on the portable device, comprising the steps of:

(a) affixing a plurality of tokens adjacent to a corresponding plurality of locations that are to be visited during the inspection, each of the plurality of tokens being associated with and affixed adjacent to a different one of the plurality of locations;

(b) enabling an operator to move the portable device proximate one of the plurality of locations;

(c) in response to the portable device responding to the token associated with said one of the plurality of locations in order to detect being moved proximate the location, automatically producing a record stored within the portable device that the portable device was proximate the location, said record providing evidence that the operator was sufficiently close to the location to perform an inspection at the location; and (d) further in response to the portable device being moved proximate the location, automatically transferring and storing the ancillary data in the recording device, said ancillary data having been collected by a data collection device disposed proximate the location.

18. A method for providing a record on a portable device that a location was visited during an inspection, while contemporaneously collecting sensor data on the portable device, comprising the steps of:

(a) enabling an operator to move the portable device proximate the location;

(b) in response to the portable device being moved proximate the location, automatically producing a record stored within the portable device that the portable device was proximate the location, said record providing evidence that the operator was sufficiently close to the location to perform an inspection at the location; and (c) further in response to the portable device being moved proximate the location, automatically transferring and storing the sensor data in the recording device.

* * * * *

UNITED STATES PATENT AND TRADEMARK OFFICE
CERTIFICATE OF CORRECTION

PATENT NO. : 7,362,229 B2 Page 1 of 1
APPLICATION NO. : 11/247953
DATED : April 22, 2008
INVENTOR(S) : Brinton et al.

It is certified that error appears in the above-identified patent and that said Letters Patent is hereby corrected as shown below:

| | |
|---|---|
| Column 11, line 14 | after "board" insert --154-- |
| Column 15, line 29 | after "that" insert --a-- |
| Column 16, line 51 | after "to" insert --a-- |
| Column 19, line 48 | after "512" delete "were" |
| Column 22, line 31 | after "sensors" delete --are-- |
| Column 23, line 50 | "chip" should read --chips-- |
| Column 24, line 1 | "have" should read --has-- |
| Column 24, line 37 | delete "step" (1st occurrence) |
| Column 24, line 62 | after "indicated" insert --in-- |
| Column 28, line 6 (Claim 13) | after "provide" delete "at least one of" |

Signed and Sealed this

Twelfth Day of August, 2008

JON W. DUDAS
*Director of the United States Patent and Trademark Office*